US012739181B2

(12) United States Patent
Yamada et al.

(10) Patent No.: US 12,739,181 B2
(45) Date of Patent: Sep. 15, 2026

(54) TRAFFIC DATA COLLECTION SYSTEM, TRAFFIC DATA COLLECTION METHOD, AND TRAFFIC DATA COLLECTION PROGRAM

(71) Applicant: NTT, Inc., Tokyo (JP)

(72) Inventors: Masato Yamada, Tokyo (JP); Yuhei Hayashi, Tokyo (JP); Atsushi Suto, Tokyo (JP); Chiharu Morioka, Tokyo (JP); Akinori Furuta, Tokyo (JP); Yuki Miyoshi, Tokyo (JP); Satomi Inoue, Tokyo (JP)

(73) Assignee: NTT, Inc., Tokyo (JP)

( * ) Notice: Subject to any disclaimer, the term of this patent is extended or adjusted under 35 U.S.C. 154(b) by 97 days.

(21) Appl. No.: 18/839,420

(22) PCT Filed: Feb. 22, 2022

(86) PCT No.: PCT/JP2022/007411

§ 371 (c)(1),
(2) Date: Aug. 17, 2024

(87) PCT Pub. No.: WO2023/162043

PCT Pub. Date: Aug. 31, 2023

(65) Prior Publication Data

US 2025/0168088 A1 May 22, 2025

(51) Int. Cl.
*H04L 43/028* (2022.01)
*H04L 43/0876* (2022.01)

(52) U.S. Cl.
CPC ........ *H04L 43/028* (2013.01); *H04L 43/0876* (2013.01)

(58) Field of Classification Search
CPC .......................... H04L 43/028; H04L 43/0876
See application file for complete search history.

(56) References Cited

U.S. PATENT DOCUMENTS

2021/0281486 A1* 9/2021 Singh Bawa ....... H04L 41/0896

FOREIGN PATENT DOCUMENTS

JP 2012105043 A 5/2012

OTHER PUBLICATIONS

Paul Aitken (2013) "Specification of the IP Flow Information Export(IPFIX) Protocol for the Exchange of Flow Information" Internet Engineering Task Force (IETF) Request for Comments: 7011, Sep. 2013 [on-line] website: https://www.rfc-editor.org/rfc/rfc7011.txt.

* cited by examiner

*Primary Examiner* — Suraj M Joshi

(57) ABSTRACT

A network monitoring system includes a reception module, an extraction module, and a recovery module. The reception module receives time-series data having a bandwidth value of a monitored network. The extraction module extracts a feature amount of the time-series data from the time-series data having the bandwidth value by applying a seasonal adjustment method to the time-series data. Accordingly, the extraction module transmits the feature amount of the time-series data via a network for collecting traffic data of the monitored network. The recovery module receives the feature amount of the time-series data via the network for collecting traffic data of the monitored network. Accordingly, the recovery module recovers the time-series data having the bandwidth value from the feature amount of the time-series data.

23 Claims, 20 Drawing Sheets

Figure 2:
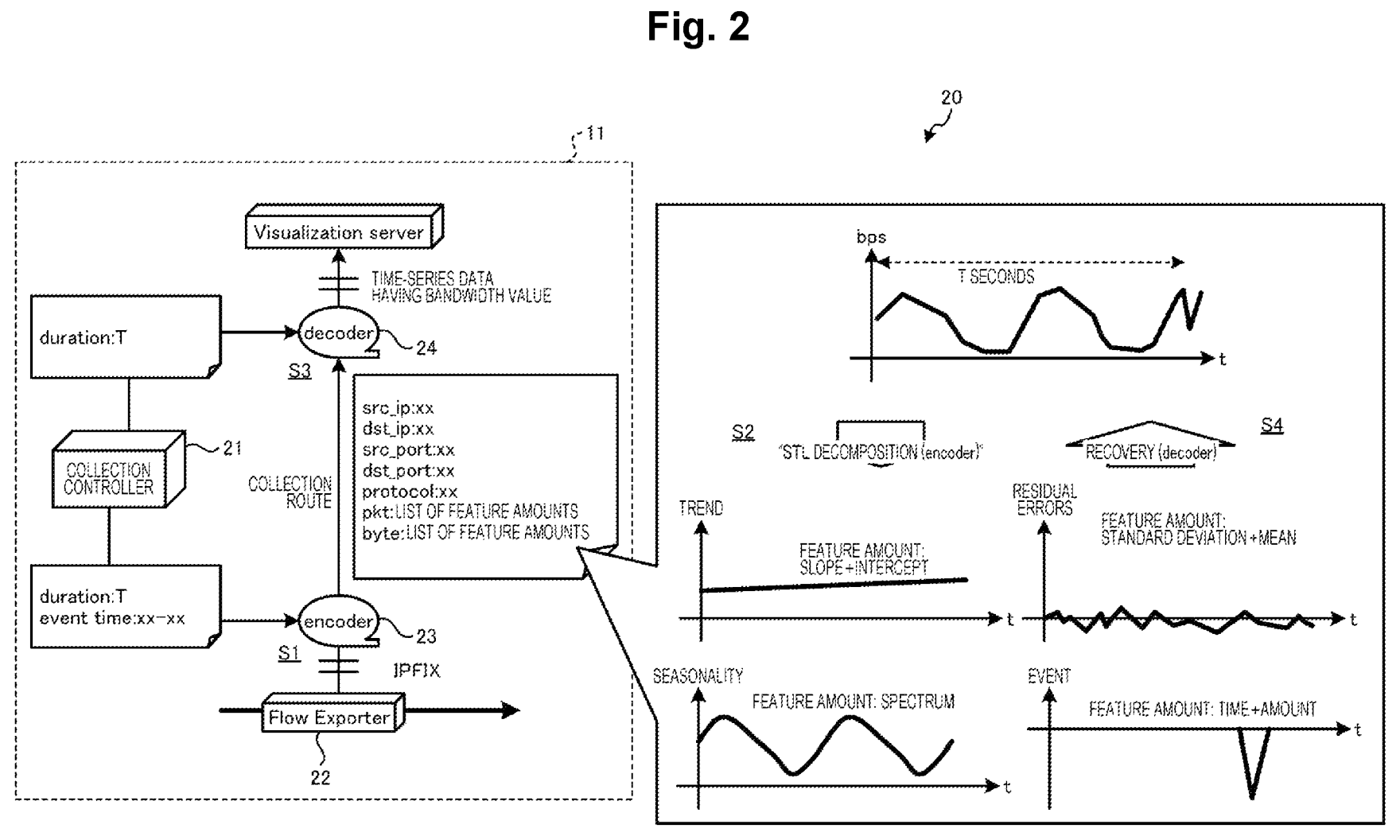

Visualization server

TIME-SERIES DATA
HAVING BANDWIDTH VALUE duration:T decoder

24

S3

COLLECTION CONTROLLER

21

COLLECTION ROUTE src_ip:xx
dst_ip:xx
src_port:xx
dst_port:xx
protocol:xx
pkt:LIST OF FEATURE AMOUNTS
byte:LIST OF FEATURE AMOUNTS duration:T
event time:xx−xx encoder

23

S1

IPFIX

Flow Exporter

22 bps

T SECONDS t

S2

"STL DECOMPOSITION (encoder)"

RECOVERY (decoder)

S4

TREND

FEATURE AMOUNT:
SLOPE+INTERCEPT

RESIDUAL ERRORS

FEATURE AMOUNT:
STANDARD DEVIATION+MEAN

SEASONALITY

FEATURE AMOUNT: SPECTRUM

EVENT

FEATURE AMOUNT: TIME+AMOUNT

Figure 5:
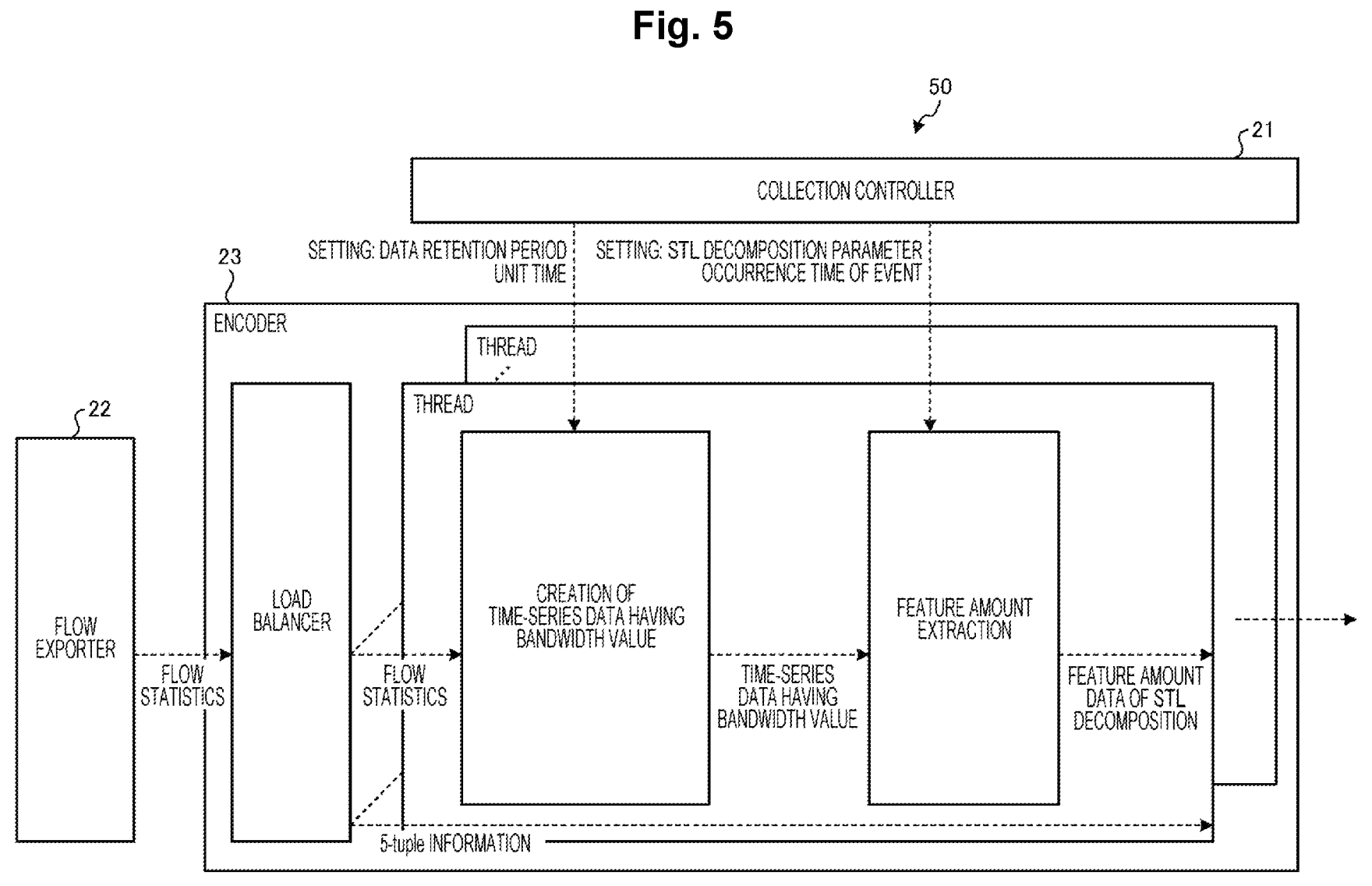

21 COLLECTION CONTROLLER

SETTING: DATA RETENTION PERIOD
UNIT TIME

SETTING: STL DECOMPOSITION PARAMETER
OCCURRENCE TIME OF EVENT

22 FLOW EXPORTER

FLOW STATISTICS

23 ENCODER

LOAD BALANCER

FLOW STATISTICS

THREAD

THREAD

CREATION OF TIME-SERIES DATA HAVING BANDWIDTH VALUE

TIME-SERIES DATA HAVING BANDWIDTH VALUE

FEATURE AMOUNT EXTRACTION

FEATURE AMOUNT DATA OF STL DECOMPOSITION 5-tuple INFORMATION 60
bps
T SECONDS
t
STL DECOMPOSITION
TREND
t
RESIDUAL ERRORS
t
SEASONALITY
t
EVENT
t
FEATURE AMOUNT EXTRACTION
TREND: SLOPE+INTERCEPT
SEASONALITY: SPECTRUM AFTER FOURIER TRANSFORM (LOW-PASS FILTERING)
RESIDUAL ERRORS: MEAN+STANDARD DEVIATION
EVENT: EVENT TIME+AMOUNT
TRANSMISSION OF FEATURE AMOUNT

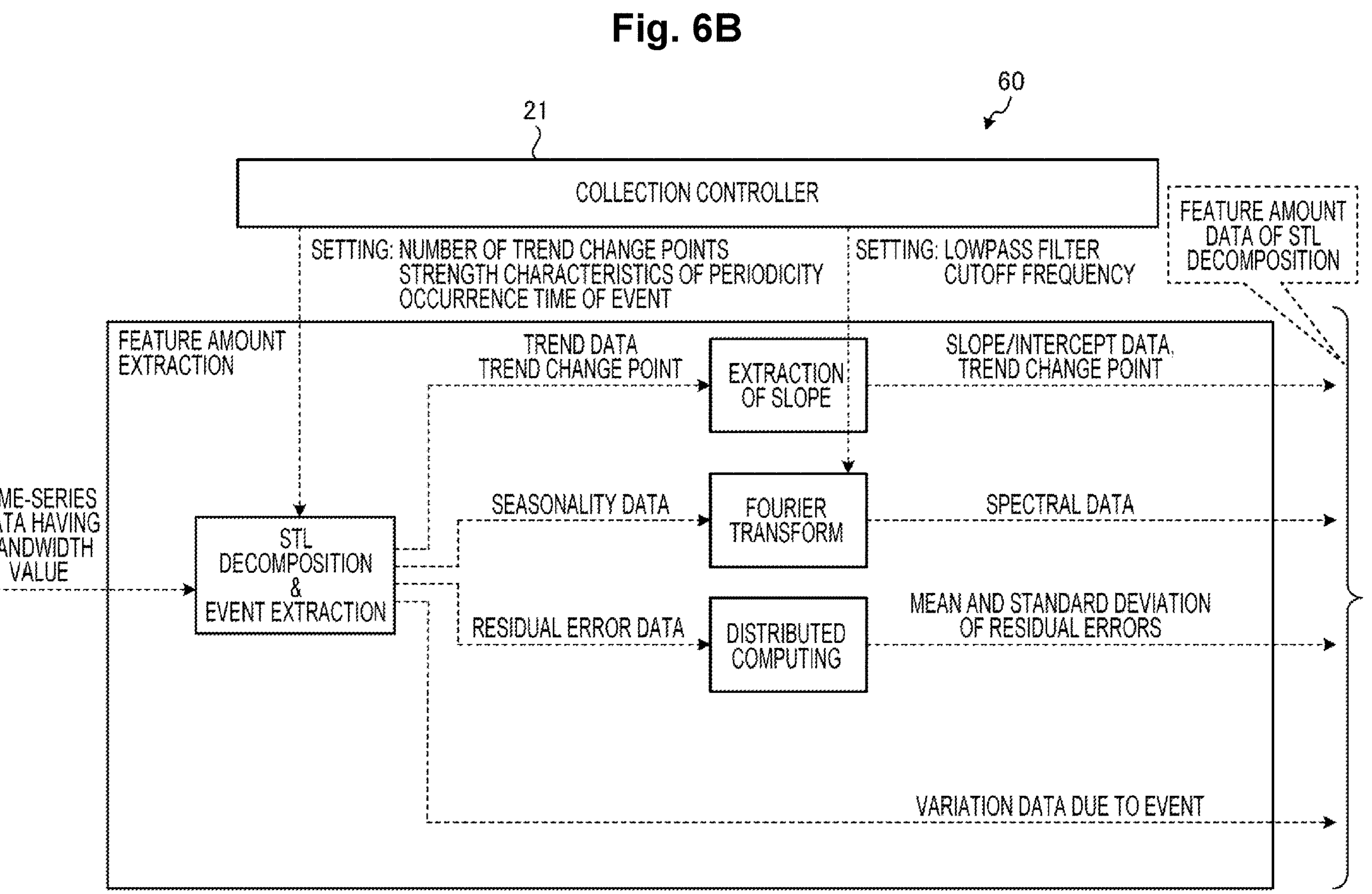
Fig. 6B
21
60
COLLECTION CONTROLLER
SETTING: NUMBER OF TREND CHANGE POINTS
STRENGTH CHARACTERISTICS OF PERIODICITY
OCCURRENCE TIME OF EVENT
SETTING: LOWPASS FILTER
CUTOFF FREQUENCY
FEATURE AMOUNT
DATA OF STL
DECOMPOSITION
FEATURE AMOUNT
EXTRACTION
TIME-SERIES
DATA HAVING
BANDWIDTH
VALUE
STL
DECOMPOSITION
&
EVENT EXTRACTION
TREND DATA
TREND CHANGE POINT
SEASONALITY DATA
RESIDUAL ERROR DATA
EXTRACTION
OF SLOPE
FOURIER
TRANSFORM
DISTRIBUTED
COMPUTING
SLOPE/INTERCEPT DATA,
TREND CHANGE POINT
SPECTRAL DATA
MEAN AND STANDARD DEVIATION
OF RESIDUAL ERRORS
VARIATION DATA DUE TO EVENT

Figure 8A:
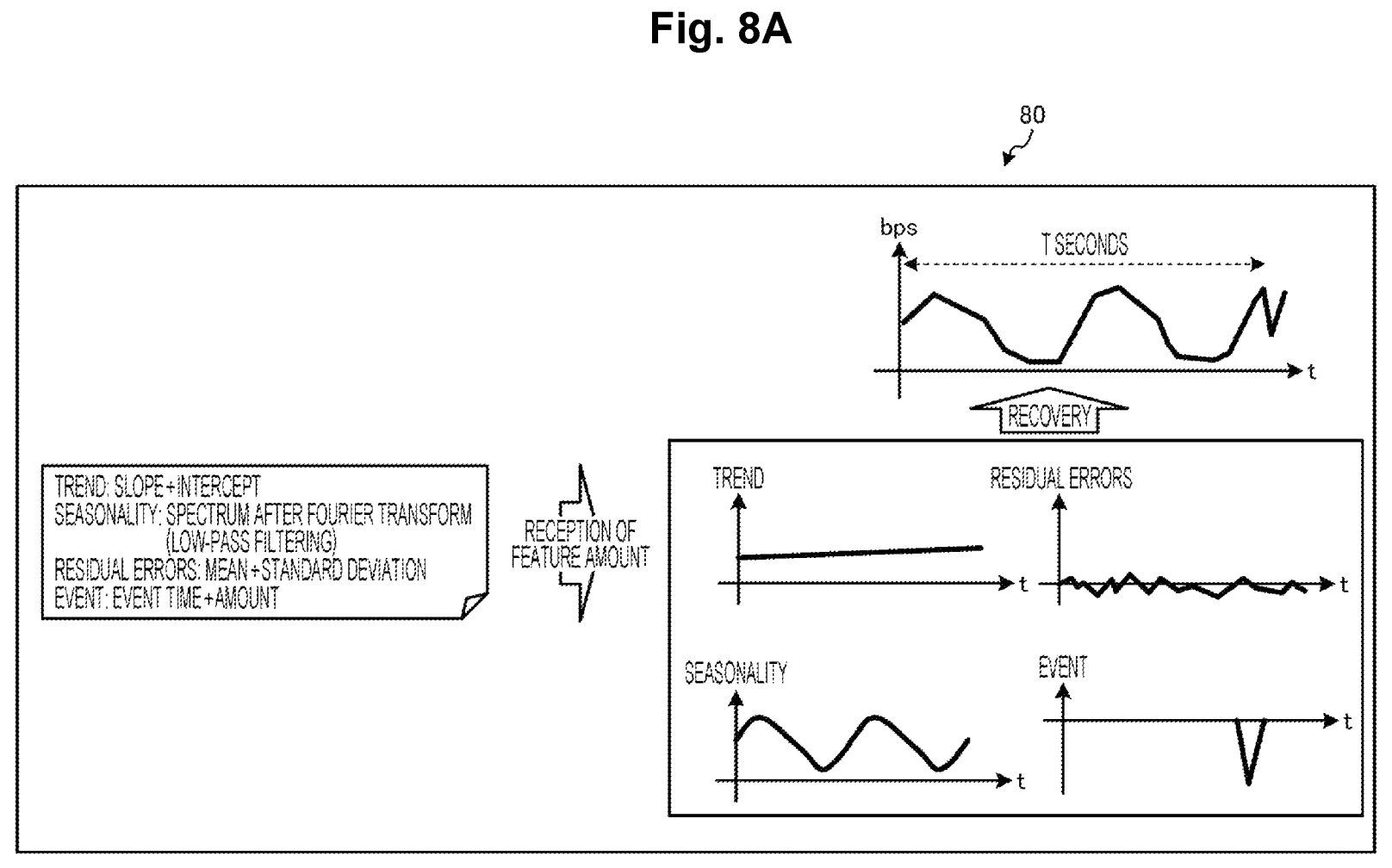

TREND: SLOPE+INTERCEPT
SEASONALITY: SPECTRUM AFTER FOURIER TRANSFORM
(LOW-PASS FILTERING)
RESIDUAL ERRORS: MEAN+STANDARD DEVIATION
EVENT: EVENT TIME+AMOUNT

RECEPTION OF
FEATURE AMOUNT

TREND
t

SEASONALITY
t

RESIDUAL ERRORS
t

EVENT
t

RECOVERY bps
T SECONDS
t

Figure 11A:
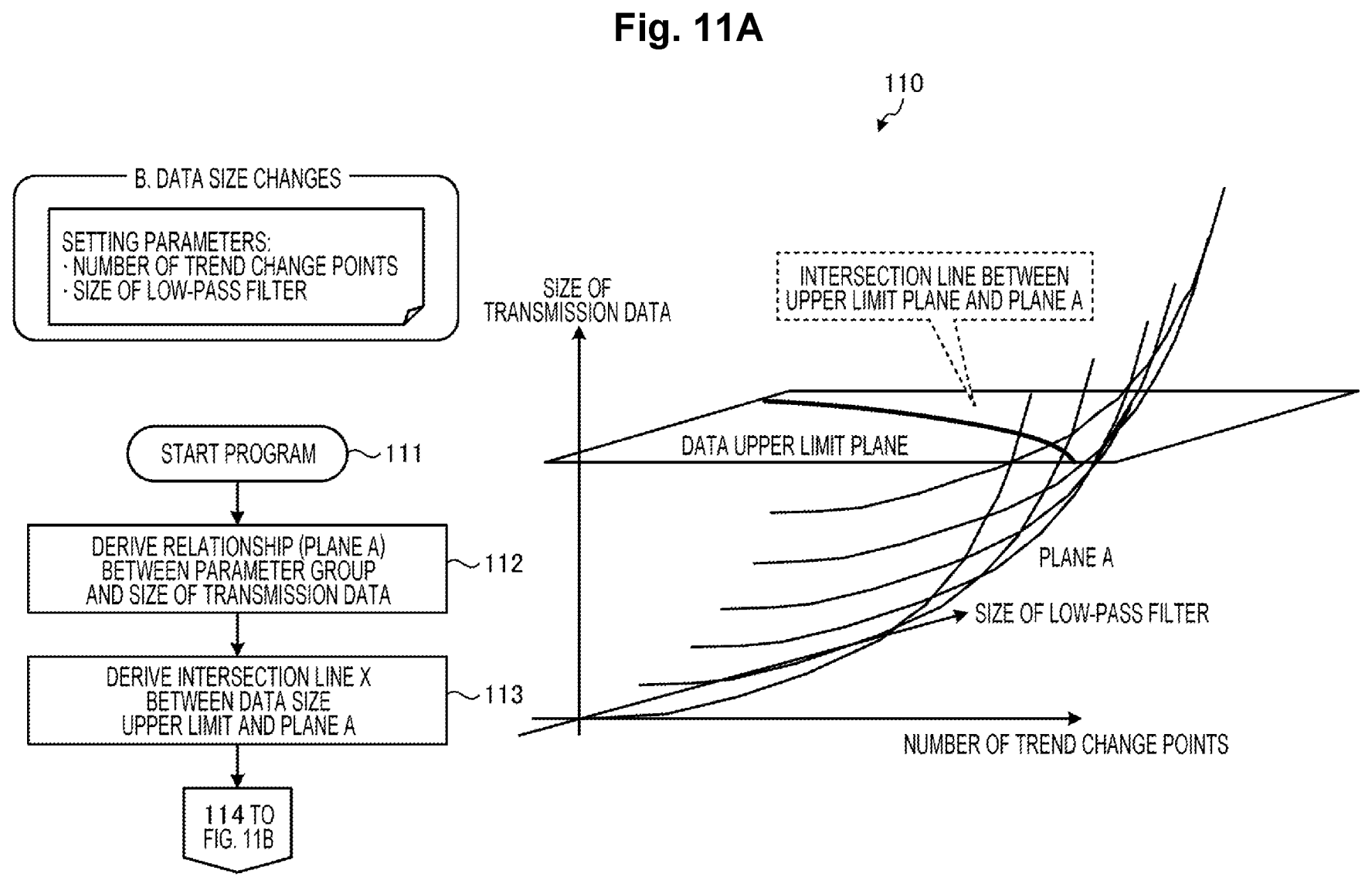

B. DATA SIZE CHANGES

SETTING PARAMETERS:
· NUMBER OF TREND CHANGE POINTS
· SIZE OF LOW-PASS FILTER

START PROGRAM ~111

DERIVE RELATIONSHIP (PLANE A) BETWEEN PARAMETER GROUP AND SIZE OF TRANSMISSION DATA ~112

DERIVE INTERSECTION LINE X BETWEEN DATA SIZE UPPER LIMIT AND PLANE A ~113

114 TO FIG. 11B

SIZE OF TRANSMISSION DATA

INTERSECTION LINE BETWEEN UPPER LIMIT PLANE AND PLANE A

DATA UPPER LIMIT PLANE

PLANE A

SIZE OF LOW-PASS FILTER

NUMBER OF TREND CHANGE POINTS

Figure 11B:
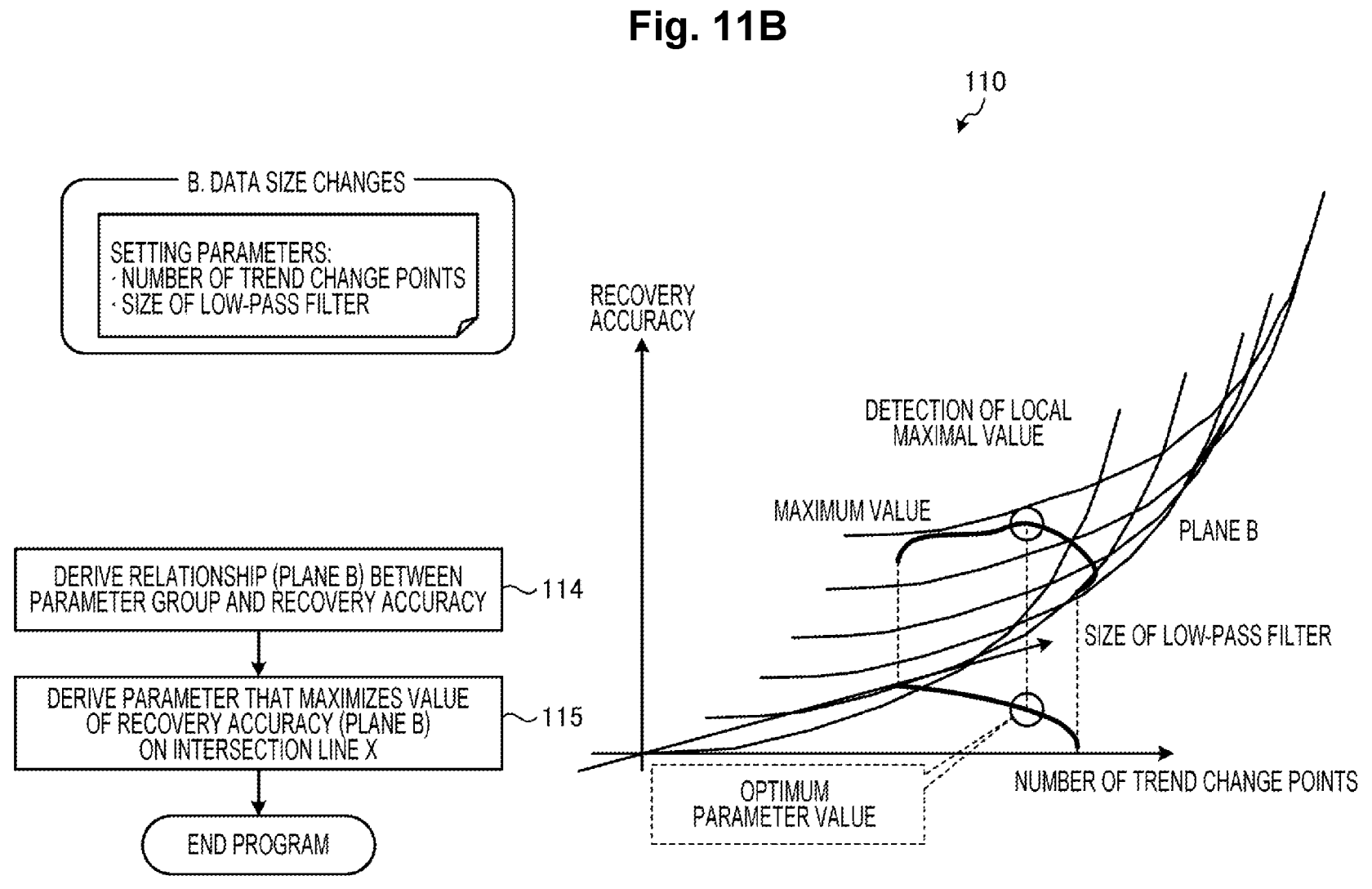

B. DATA SIZE CHANGES

SETTING PARAMETERS:
· NUMBER OF TREND CHANGE POINTS
· SIZE OF LOW-PASS FILTER

DERIVE RELATIONSHIP (PLANE B) BETWEEN PARAMETER GROUP AND RECOVERY ACCURACY — 114

DERIVE PARAMETER THAT MAXIMIZES VALUE OF RECOVERY ACCURACY (PLANE B) ON INTERSECTION LINE X — 115

END PROGRAM

RECOVERY ACCURACY

DETECTION OF LOCAL MAXIMAL VALUE

MAXIMUM VALUE

PLANE B

SIZE OF LOW-PASS FILTER

NUMBER OF TREND CHANGE POINTS

OPTIMUM PARAMETER VALUE

B. DATA SIZE CHANGES
SETTING PARAMETERS:
· NUMBER OF TREND CHANGE POINTS
· SIZE OF LOW-PASS FILTER
110
bps
T SECONDS
t
STL DECOMPOSITION
TREND
t
RESIDUAL ERRORS
t
117
SEASONALITY
t
EVENT
t
FOURIER TRANSFORM FOR SEASONALITY DATA
Hz 120
34
ADJUSTMENT MODULE
35
RECEPTION MODULE
36
EXTRACTION MODULE
37
RECOVERY MODULE
S121: TRANSMIT PARAMETER
S122: TRANSMIT TIME-SERIES DATA
S123: EXTRACT FEATURE AMOUNT FROM TIME-SERIES DATA BASED ON PARAMETER
S124: TRANSMIT FEATURE AMOUNT
S125: RECOVER TIME SERIES DATA FROM FEATURE AMOUNT 1000
COMPUTER
1130
DISPLAY
1110
MOUSE
1120
KEYBOARD
1010
MEMORY
1011
ROM
1012
RAM
1020
CPU
1060
VIDEO ADAPTER
1050
SERIAL PORT INTERFACE
1080 BUS
1030
HARD DISK DRIVE INTERFACE
1040
DISK DRIVE INTERFACE
1070
NETWORK INTERFACE
1090
HARD DISK DRIVE
1100
DISK DRIVE
1091
OS
1092
APPLICATION PROGRAM
1093
PROGRAM MODULE
1094
PROGRAM DATA

TRAFFIC DATA COLLECTION SYSTEM, TRAFFIC DATA COLLECTION METHOD, AND TRAFFIC DATA COLLECTION PROGRAM

CROSS-REFERENCE TO RELATED APPLICATIONS

This application is a U.S. 371 Application of International Patent Application No. PCT/JP2022/007411, filed on 22 Feb. 2022, the disclosure of which is hereby incorporated herein by reference in its entirety.

TECHNICAL FIELD

The present disclosure relates to a traffic data collecting system, a method for collecting traffic data, and a program for collecting traffic data.

BACKGROUND ART

After a network is constructed, maintenance and operation of the network are performed to keep operating the network normally. For the maintenance and the operation, network monitoring systems generally collect information on traffic flowing across the network.

The traffic is data flowing across the network. The data is also referred to as network traffic. The term "traffic" may mean the amount of data (traffic amount) flowing across the network depending on the context. The traffic is processed in data units called packets. A series of packets is referred to as a flow.

There are various approaches for collecting information on traffic. For example, one approach is to transmit information on traffic statistics for each flow. In addition, another approach is to transmit, via the network, traffic time-series data for each period in which a packet arrives.

CITATION LIST

Patent Literature

Patent Literature 1: JP 2012-105043 A

Non Patent Literature

Non Patent Literature 1: "RFC 7011-Specification of the IP Flow Information Export (IPFIX) Protocol for the Exchange of Flow Information" [online] [retrieved on Feb. 22, 2022], the Internet <https://datatracker.ietf.org/doc/html/rfc7011>

SUMMARY OF INVENTION

Technical Problem

However, in the above-described related art, it may be difficult to reduce a load imposed on a bandwidth of a network for collecting information on traffic.

In this respect, the present disclosure proposes a traffic data collecting system, a method for collecting traffic data, and a program for collecting traffic data capable of reducing a load on a bandwidth of a network for collecting information on traffic.

Solution to Problem

According to an aspect of the present disclosure, there is provided a traffic data collecting system including: a first reception module that receives time-series data having a bandwidth value of a monitored network; an extraction module that extracts a feature amount of the time-series data from the time-series data having the bandwidth value by applying a seasonal adjustment method to the time-series data; a transmission module that transmits the feature amount of the time-series data via a network for collecting traffic data of the monitored network; a second reception module that receives the feature amount of the time-series data via the network for collecting traffic data of the monitored network; and a recovery module that recovers the time-series data having the bandwidth value from the feature amount of the time-series data.

Advantageous Effects of Invention

A traffic data collecting system according to one or a plurality of embodiments of the present disclosure can reduce a load imposed on a bandwidth of a network for collecting information on traffic.

BRIEF DESCRIPTION OF DRAWINGS

FIG. 2 illustrates an overview of a network monitoring process according to the present disclosure.

FIG. 5 illustrates an example of a functional architecture of an encoder according to the present disclosure.

FIG. 6B illustrates an example of feature amount extraction according to the present disclosure.

FIG. 8A illustrates an example of time-series data recovery according to the present disclosure.

FIG. 11A illustrates an example of optimization of a parameter group B according to the present disclosure.

FIG. 11B illustrates another example of optimization of the parameter group B according to the present disclosure.

DESCRIPTION OF EMBODIMENTS

Figure 1:
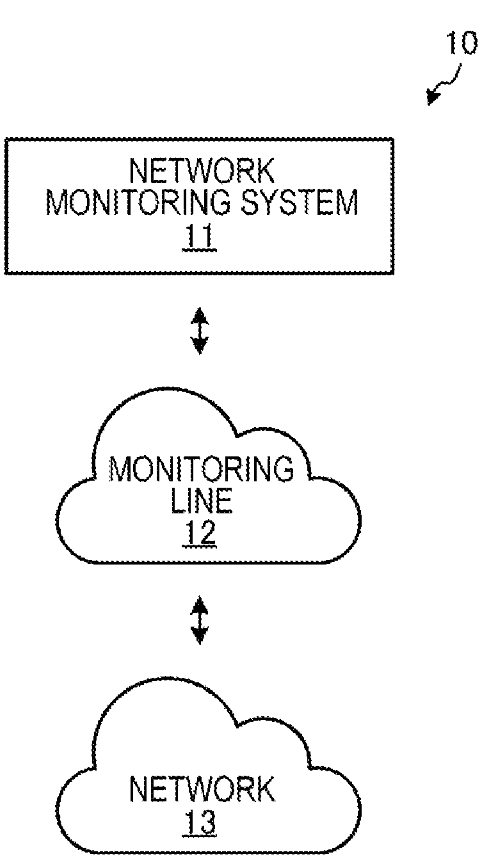
FIG. 1 is a block diagram of an example of an environment for network monitoring.

A plurality of embodiments will be described below in detail with reference to the drawings. Note that the present invention is not limited to the plurality of embodiments. A plurality of characteristics of various embodiments may be combined in various ways as long as the plurality of characteristics do not contradict each other. The same elements are denoted by the same reference numerals, and the redundant description thereof will be omitted.

The following description consists of ten sections: 1. Introduction, 2. Environment for Network Monitoring, 3. Overview of Network Monitoring Process, 4. Configuration of Network Monitoring System, 5. Details of Network Monitoring Process, 6. Sequence Diagram of Network Monitoring Process, 7. Effects, 8. Others, 9. Hardware Configuration, and 10. Summary of Embodiments.

1. Introduction

Traffic data of a monitored network is collected by a network monitoring system. Time-series data of traffic is sent from a flow exporter to a flow collector or a traffic data collector. As the monitored network increases in size and then a traffic amount increases, the amount of collected traffic also increases. This leads to congestion in a collection route. The collection route is a network for collecting traffic data of a monitored network.

Examples of an approach for solving such a problem include sampling. The sampling can limit the amount of information to be sent out. However, in a case where time-series data of traffic is collected at a low sampling rate, accuracy of the obtained time-series data deteriorates.

As described above, there is also an approach for transmitting information on traffic statistics for each flow. However, in the approach using the information on traffic statistics, traffic data other than a bandwidth value is also sent out. Hence, this approach increases a bandwidth usage rate of a network of a collection route.

In addition, as described above, there is also another approach of transmitting traffic time-series data for each period in which a packet arrives, via a network. However, in the approach using the period in which the packet arrives, the time-series data itself is transmitted. Hence, this approach increases a load on a collection route.

To solve the above problem, a network monitoring system according to one or more embodiments of the present disclosure performs one or more network monitoring processes to be described below.

2. Environment for Network Monitoring

First, an environment for network monitoring according to the present disclosure will be described with reference to FIG. 1.

FIG. 1 is a block diagram of an environment 10 which is an example of the environment for network monitoring. As illustrated in FIG. 1, the environment 10 includes a network monitoring system 11, a monitoring line 12, and a network 13.

The network monitoring system 11 is a system that performs one or more network monitoring processes. The one or more network monitoring processes include a process of collecting traffic data. An overview of the network monitoring processes according to the present disclosure will be described in the next section.

The network monitoring system 11 includes one or more data processing devices, such as one or more servers, one or more personal computers (PCs), or one or more network devices. An example of a configuration of the network monitoring system 11 will be described in Section 4.

The monitoring line 12 is, for example, a line such as a wide area network (WAN) line, an Internet line, or the like. The monitoring line 12 connects the network monitoring system 11 and the network 13.

The network 13 is a monitored network. The network 13 is, for example, a network such as the WAN.

3. Overview of Network Monitoring Process

First, the overview of the network monitoring processes according to the present disclosure will be described with reference to FIG. 2. Note that this overview is not intended to limit the present invention or the plurality of embodiments to be described in the following sections.

FIG. 2 illustrates an overview 20 of a network monitoring process according to the present disclosure.

As illustrated in FIG. 2, the network monitoring system 11 includes a collection controller 21, a flow exporter 22, an encoder 23, and a decoder 24. The collection controller 21 is implemented by, for example, a server. The flow exporter 22 is implemented by, for example, a router. The encoder 23 and the decoder 24 are implemented by, for example, a router or a switch.

In Step S1, the encoder 23 receives time-series data having a bandwidth value from the flow exporter 22 by using Internet Protocol (IP) Flow Information Export (IPFIX). The encoder 23 retains a bandwidth value of a data retention period and 5-tuple information. The encoder 23 creates time-series data having a bandwidth value on the basis of the data retention period. Accordingly, the encoder 23 retains the created time-series data.

The data retention period is set by the collection controller 21. In the example of FIG. 2, the data retention period is "duration: T". The collection controller 21 sets this data retention period in the encoder 23 and the decoder 24. Further, the collection controller 21 sets an event time in the encoder 23. In the example of FIG. 2, the event time is "event time: xx-xx".

In Step S2, the collection controller 21 adjusts parameters of seasonal and trend decomposition using locally estimated scatterplot smoothing (Loess) (STL) decomposition. As will be described below, the STL decomposition is used to extract a feature amount from time-series data having a bandwidth value.

The collection controller 21 determines an adjustment approach and an adjustment order of parameters of the STL decomposition based on characteristics of the parameters. A specific adjustment approach will be described below with reference to FIGS. 9A and 9B.

In Step S3, the encoder 23 decomposes the time-series data having a bandwidth value into a trend term, a seasonality term, and a residual error term using the STL decomposition. The STL decomposition is performed based on the adjusted parameters. Then, the encoder 23 extracts feature amounts from the trend term, the seasonality term, and the residual error term.

The feature amount of a trend is a slope and an intercept. The feature amount of seasonality is a spectrum. The feature amount of a residual error is a standard deviation and a mean.

Further, the encoder 23 extracts an event term from the time-series data having the bandwidth value. The feature amount of an event is a time and an amount.

The encoder 23 sends the feature amounts of the trend term, the seasonality term, and the residual error term, and the event term to the decoder 24. A route between the encoder 23 and the decoder 24 is a collection route of traffic data. In this manner, the encoder 23 transmits the extracted feature amounts instead of the bandwidth value.

In Step S4, the decoder 24 receives the feature amounts of the trend term, the seasonality term, and the residual error term, and the event term. Accordingly, the decoder 24 recovers the time-series data having the bandwidth value from the received feature amounts and the event term. For example, the decoder 24 creates a trend term, a seasonality term, and a residual error term by using the received feature amounts. Accordingly, the decoder 24 recovers the time-series data having a bandwidth value by adding the trend term, the seasonality term, the residual error term, and the event term.

As described above, the encoder 23 of the network monitoring system 11 utilizes STL decomposition to send out the time-series data having a bandwidth value. Hence, the network monitoring system 11 can reduce an amount of data having a bandwidth value in the traffic data. As a result, the network monitoring system 11 can reduce a load on a collection route in the network monitoring system 11.

4. Configuration of Network Monitoring System

Next, an example of a configuration of the network monitoring system 11 will be described with reference to FIG. 3.

Figure 3:
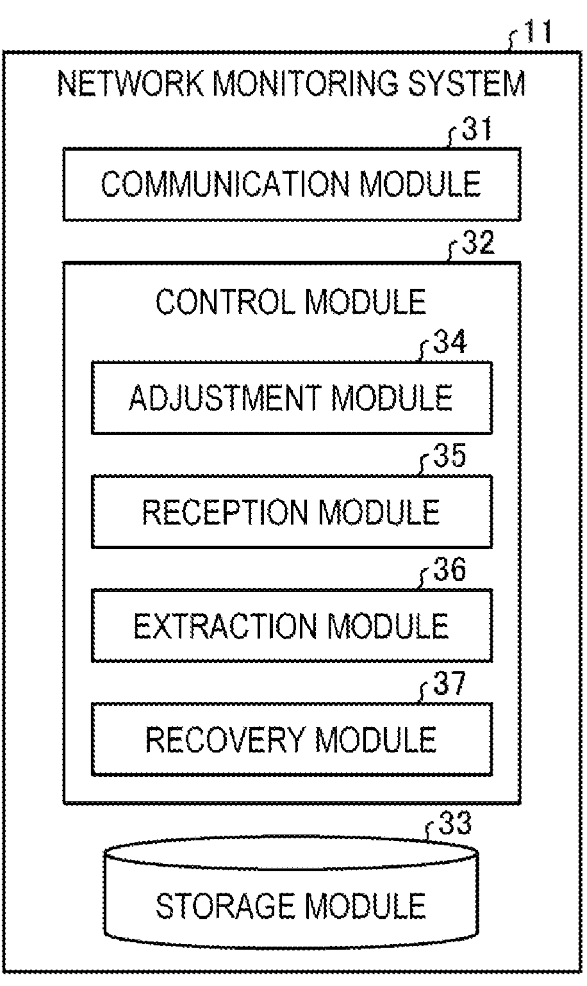
FIG. 3 is a block diagram of an example of a configuration of a network monitoring system according to the present disclosure.

FIG. 3 is a block diagram of the network monitoring system 11 which is an example of a configuration of the network monitoring system according to the present disclosure. As illustrated in FIG. 3, the network monitoring system 11 includes a communication module 31, a control module 32, and a storage module 33. The network monitoring system 11 may include an input module (for example, a keyboard or a mouse) that receives an input from an administrator of the network monitoring system 11. In addition, the network monitoring system 11 may include an output module (for example, a liquid crystal display or an organic electro luminescence (EL) display) that displays information to the administrator of the network monitoring system 11.

4-1. Communication Module 31

The communication module 31 is implemented by a network device such as a network interface card (NIC), an optical fiber cable, a layer 2 (L2) switch, a layer 3 (L3) switch, or a router. The communication module 31 is connected to the monitoring line 12. The communication module 31 can transmit and receive information to and from the network 13 via the monitoring line 12.

4-2. Control Module 32

The control module 32 is a controller. The control module 32 is implemented by one or more processors (for example, a central processing unit (CPU) or a micro processing unit (MPU)) that execute various programs stored in a storage device of the network monitoring system 11, by using a random access memory (RAM) as a work area. In addition, the control module 32 may be implemented by an integrated circuit such as an application specific integrated circuit (ASIC), a field programmable gate array (FPGA), a general purpose graphic processing unit (GPGPU), or the like.

As illustrated in FIG. 3, the control module 32 includes an adjustment module 34, a reception module 35, an extraction module 36, and a recovery module 37. The one or more processors of the network monitoring system 11 enable each control module to be implemented by executing an instruction stored in one or more memories of the network monitoring system 11. Data processing to be performed by each control module is an example, and each control module (for example, the extraction module 36) may perform data processing to be described in association with another control module (for example, the reception module 35).

4-2-1. Adjustment Module 34

The adjustment module 34 adjusts the parameters of the STL decomposition. The adjustment module 34 may be implemented by the collection controller 21 of FIG. 2. The collection controller 21 is implemented, for example, by a server in the network monitoring system 11.

4-2-2. Reception Module 35

The reception module 35 receives time-series data having a bandwidth value of a monitored network. The reception module 35 is an example of a first reception module. The monitored network is, for example, the network 13 in FIG. 1. The reception module 35 may be implemented by the flow exporter 22 of FIG. 2. The flow exporter 22 is implemented, for example, by a router in the network monitoring system 11.

4-2-3. Extraction Module 36

The extraction module 36 extracts feature amounts of the time-series data from the time-series data having the bandwidth value. In addition, the extraction module 36 is an example of a transmission module. The extraction module 36 transmits the feature amounts of the time-series data. The extraction module 36 may be implemented by the encoder 23 of FIG. 2. The encoder 23 is implemented by, for example, a router or a switch in the network monitoring system 11.

The extraction module 36 can apply a seasonal adjustment method to the time-series data. For example, the extraction module 36 can use the STL decomposition. In order to extract the feature amounts of the time-series data, the extraction module 36 can also use various seasonal adjustment methods other than the STL decomposition. For example, the extraction module 36 can use other seasonal adjustment methods such as X-11, X-12-ARIMA, or the like.

4-2-4. Recovery Module 37

The recovery module 37 recovers the time-series data having the bandwidth value from the feature amounts of the time-series data. In addition, the recovery module 37 is an example of a second reception module. The recovery module 37 receives the feature amounts of the time-series data. The recovery module 37 may be implemented by the decoder 24 in FIG. 2. The decoder 24 is implemented by, for example, a router or a switch in the network monitoring system 11.

4-3. Storage Module 33

The storage module 33 is implemented by, for example, a semiconductor memory element such as a RAM or a flash memory, or a storage device such as a hard disk or an optical disk. The storage module 33 stores various items of data used for the network monitoring process, such as parameters of the STL decomposition.

5. Details of Network Monitoring Process

The overview of the network monitoring process according to the present disclosure has been described above with reference to FIG. 2. In this section, an example of the network monitoring process according to the present disclosure will be described in more detail.

Figure 4:
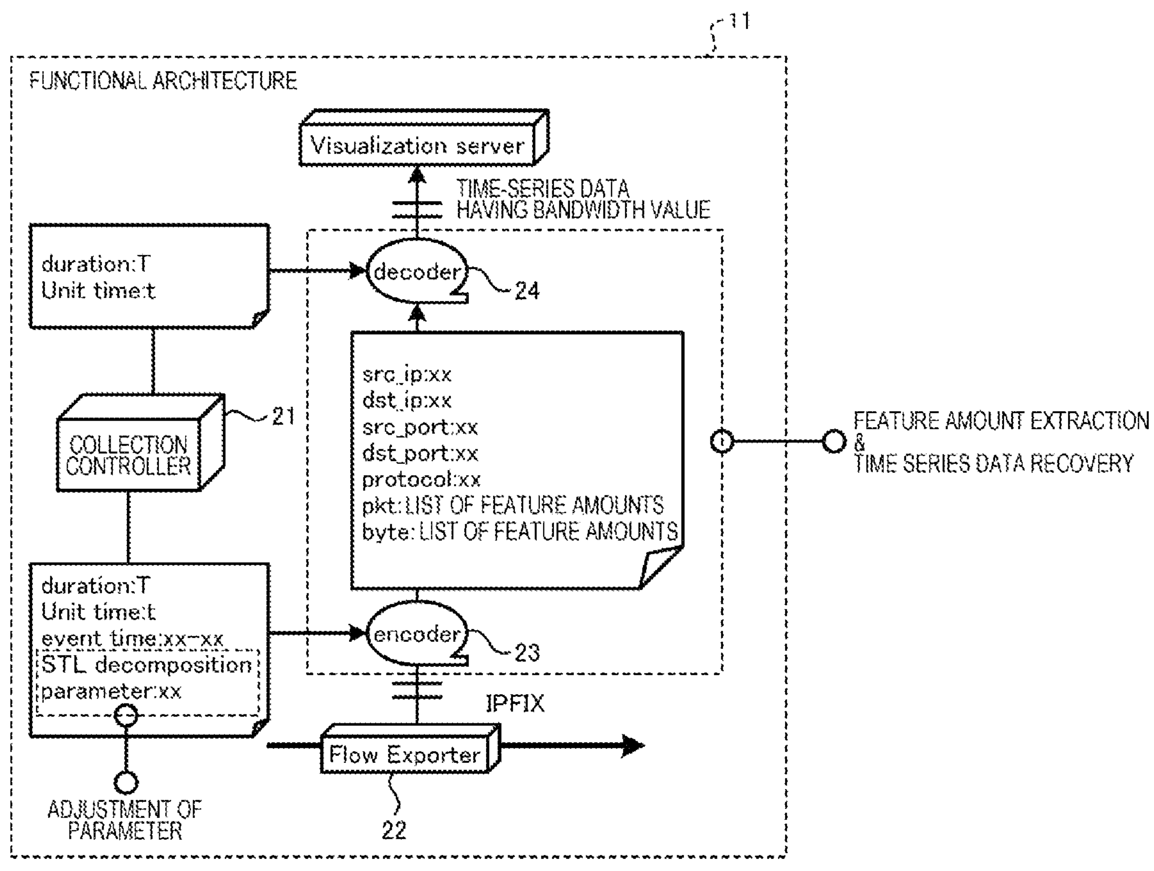
FIG. 4 illustrates an example of a functional architecture of the network monitoring system according to the present disclosure.

FIG. 4 illustrates an example of a functional architecture of the network monitoring system 11 according to the present disclosure. As illustrated in FIG. 4, the network monitoring system 11 has three functions.

The first function is to extract a feature amount from time-series data having a bandwidth value by using the STL decomposition. The second function is to recover the time-series data by using the feature amount. The third function is to set parameters for the STL decomposition.

The first function will be described below in more detail with reference to FIGS. 5, 6A, and 6B. The second function will be described below in more detail with reference to FIGS. 7, 8A, and 8B. The third function will be described below in more detail with reference to FIGS. 9A, 9B, 10A, 10B, 11A, 11B, 11C, and 11D.

5-1. Functional Architecture of Encoder

FIG. 5 illustrates a functional architecture 50 that is an example of a functional architecture of an encoder according to the present disclosure. As illustrated in FIG. 5, the encoder 23 receives flow statistics from the flow exporter 22. The encoder 23 generates feature amount data having a bandwidth value from the flow statistics. The setting of the encoder 23 is performed by the collection controller 21.

The encoder 23 creates time-series data having a bandwidth value of a designated period (data retention period). This period is set by the collection controller 21. In addition, the encoder 23 retains 5-tuple information only during this period.

The encoder 23 extracts a feature amount from the time-series data by using an event time (occurrence time of the event). The event time is set by the collection controller 21. The encoder 23 performs the STL decomposition on the time-series data based on the parameters of the STL decomposition. The feature amount data of the bandwidth value is extracted from the decomposed time-series data. For scaling-out, the encoder 23 can perform multi-threading.

5-2. Feature Amount Extraction

Figure 6A:
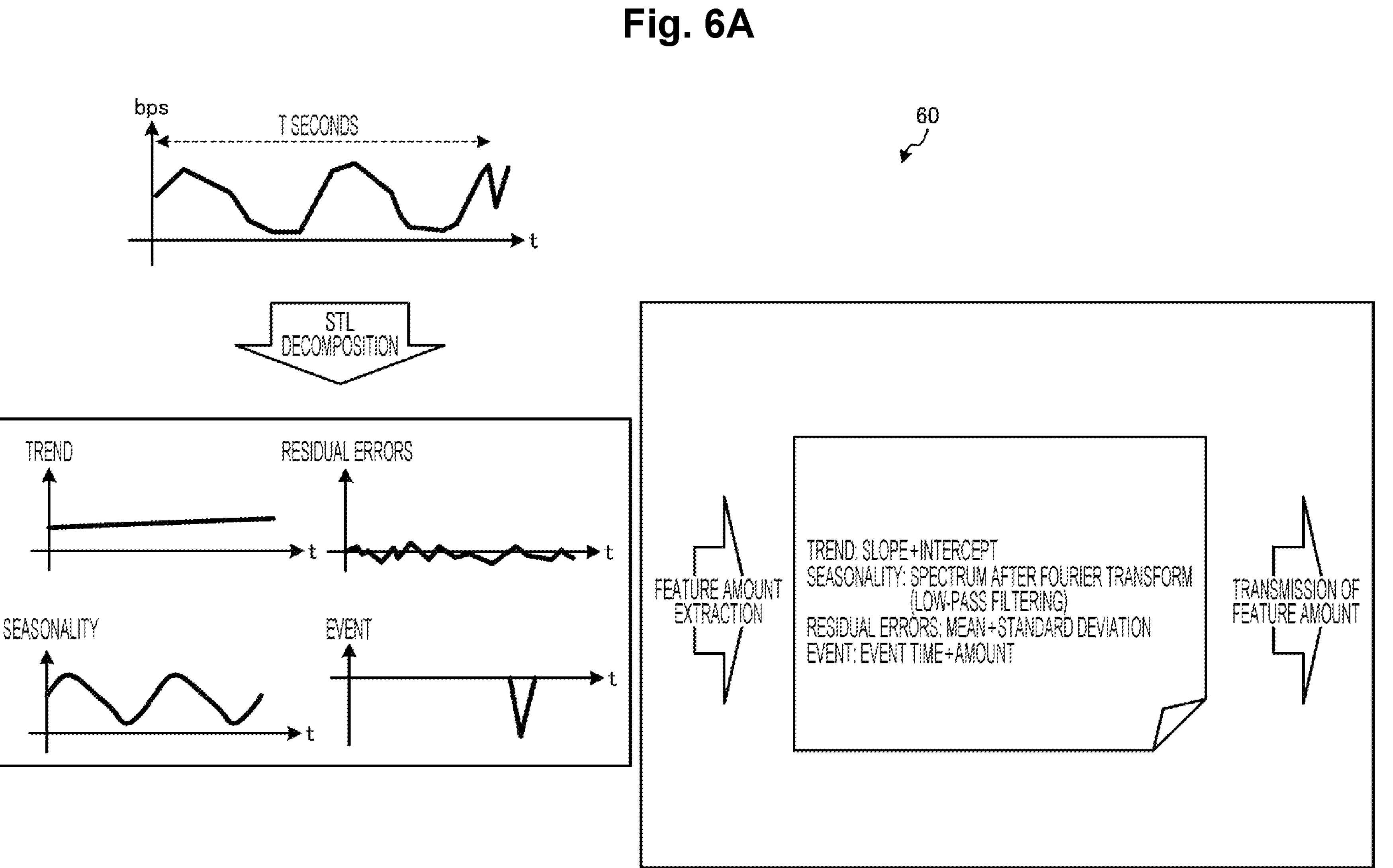
FIG. 6A illustrates an example of feature amount extraction according to the present disclosure.

FIGS. 6A and 6B collectively illustrate feature amount extraction 60 which is an example of feature amount extraction according to the present disclosure. As illustrated in FIG. 6A, the STL decomposition is applied to the time-series data having a bandwidth value. The time-series data is decomposed into a trend, seasonality, a residual error, and an event. The feature amount data extracted from the time-series data includes (1) a slope and an intercept of a trend, (2) a spectrum (low-pass filtering) after the Fourier transform of seasonality is performed, (3) a mean and a standard deviation of residual errors, and (4) an event time and an amount of an event.

As illustrated in FIG. 6B, the collection controller 21 sets parameters such as the number of trend change points, strength characteristics of periodicity, and occurrence time of the event. The encoder 23 generates data such as trend data, trend change points, seasonal data, and residual error data by applying the STL decomposition to the time-series data having a bandwidth value. This data generation is performed based on the parameters set by the collection controller 21. Further, the encoder 23 generates variation data due to an event from the time-series data having a bandwidth value.

The encoder 23 extracts a slope from the trend data. The encoder 23 generates the spectral data by applying the Fourier transform to the seasonality data. To generate the spectral data, the encoder 23 can use a low pass filter cutoff frequency set by the collection controller 21. The encoder 23 calculates the mean and the standard deviation of the residual errors by applying residual computation to the residual error data. The encoder 23 transmits, as "feature amount data of the STL decomposition", (1) slope/intercept data and trend change points, (2) spectral data, (3) a mean and a standard deviation of residual errors, and (4) variation data due to an event.

5-3. Functional Architecture of Decoder

Figure 7:
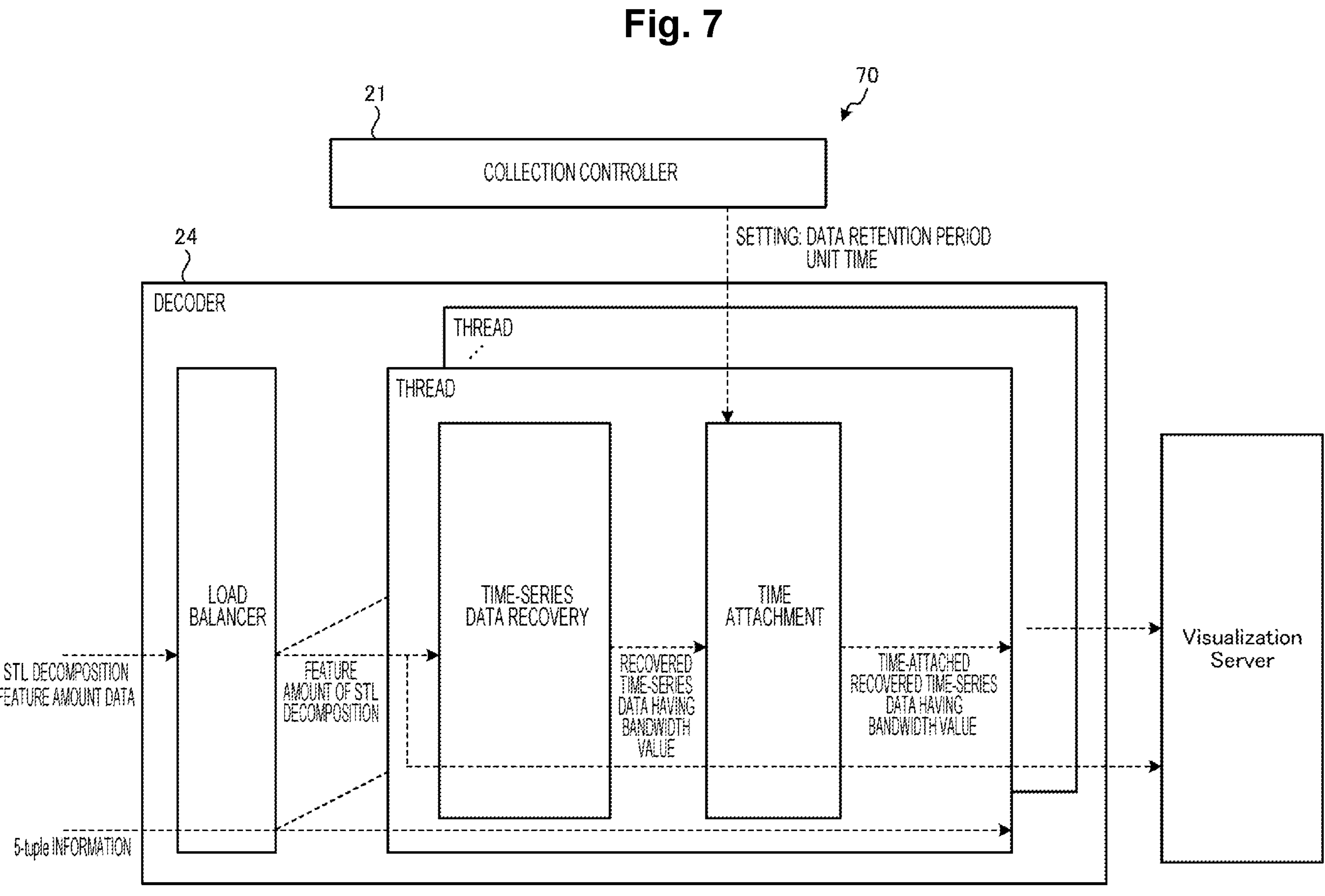
FIG. 7 illustrates an example of a functional architecture of a decoder according to the present disclosure.

FIG. 7 illustrates a functional architecture 70 that is an example of a functional architecture of a decoder according to the present disclosure. As illustrated in FIG. 7, the decoder 24 recovers the time-series data having the bandwidth value from the feature amount data of the STL decomposition. Accordingly, the decoder 24 transmits the time-series data having the bandwidth value to a visualization server.

The decoder 24 recovers the time-series data having the bandwidth value, based on the data retention period set by the collection controller 21 and the feature amount data of the STL decomposition. The time-series data having a recovered bandwidth value is generated from the feature amount data of the STL decomposition. Accordingly, a time is added to the time-series data having a recovered bandwidth value. The time is added based on the data retention period.

In order to support various analysis technologies, the decoder 24 may transmit not only the time-series data having a recovered bandwidth value but also the feature amount data itself to the visualization server. For scaling-out, the decoder 24 can perform multi-threading, similar to the encoder 23.

5-4. Time-Series Data Recovery

Figure 8B:
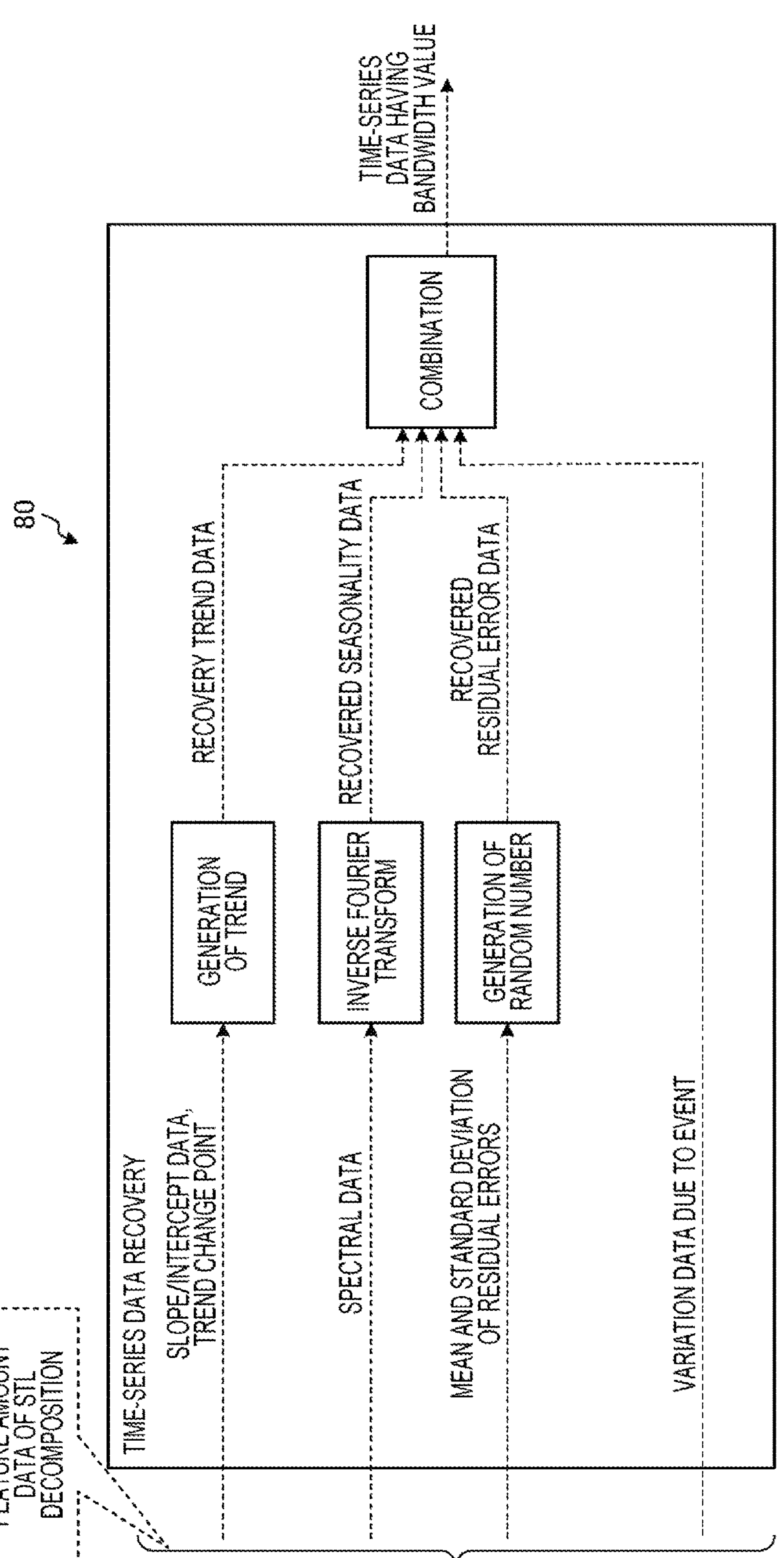
FIG. 8B illustrates an example of time-series data recovery according to the present disclosure.

FIGS. 8A and 8B collectively illustrate time-series data recovery 80 which is an example of time-series data recovery according to the present disclosure. As illustrated in FIG. 8A, the time-series data having a bandwidth value is recovered from the feature amount data of the STL decomposition. As described above with reference to FIG. 6A, the feature amount data of the STL decomposition includes (1) a slope and an intercept of a trend, (2) a spectrum (low-pass filtering) after the Fourier transform of seasonality is performed, (3) a mean and a standard deviation of residual errors, and (4) an event time and an amount of an event.

As illustrated in FIG. 8B, the decoder 24 generates the recovery trend data from the slope/intercept data and the trend change points. The decoder 24 generates recovery seasonality data by applying the inverse Fourier transform to the spectral data. Decoder 24 generates recovery residual error data by applying random number generation to the mean and the standard deviation of the residual errors. The decoder 24 generates the time-series data having a recovered bandwidth value by combining the recovery trend data, the recovery seasonality data, the recovery residual error data, and the variation data due to the event.

5-5. Adjustment of Feature Amount Extraction Parameters

Figure 9A:
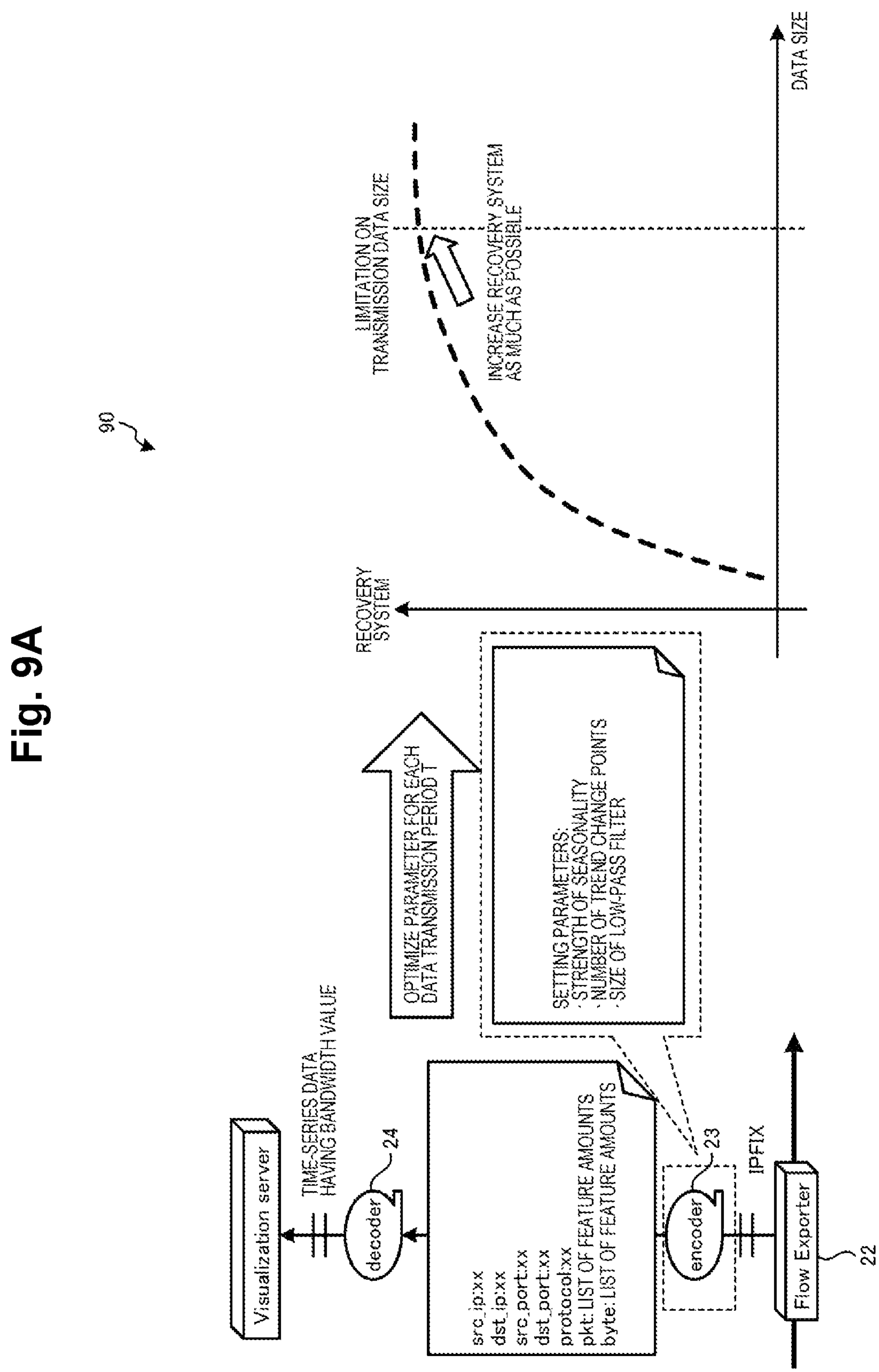
FIG. 9A illustrates an example of adjustment of a feature amount extraction parameter according to the present disclosure.
Figure 9B:
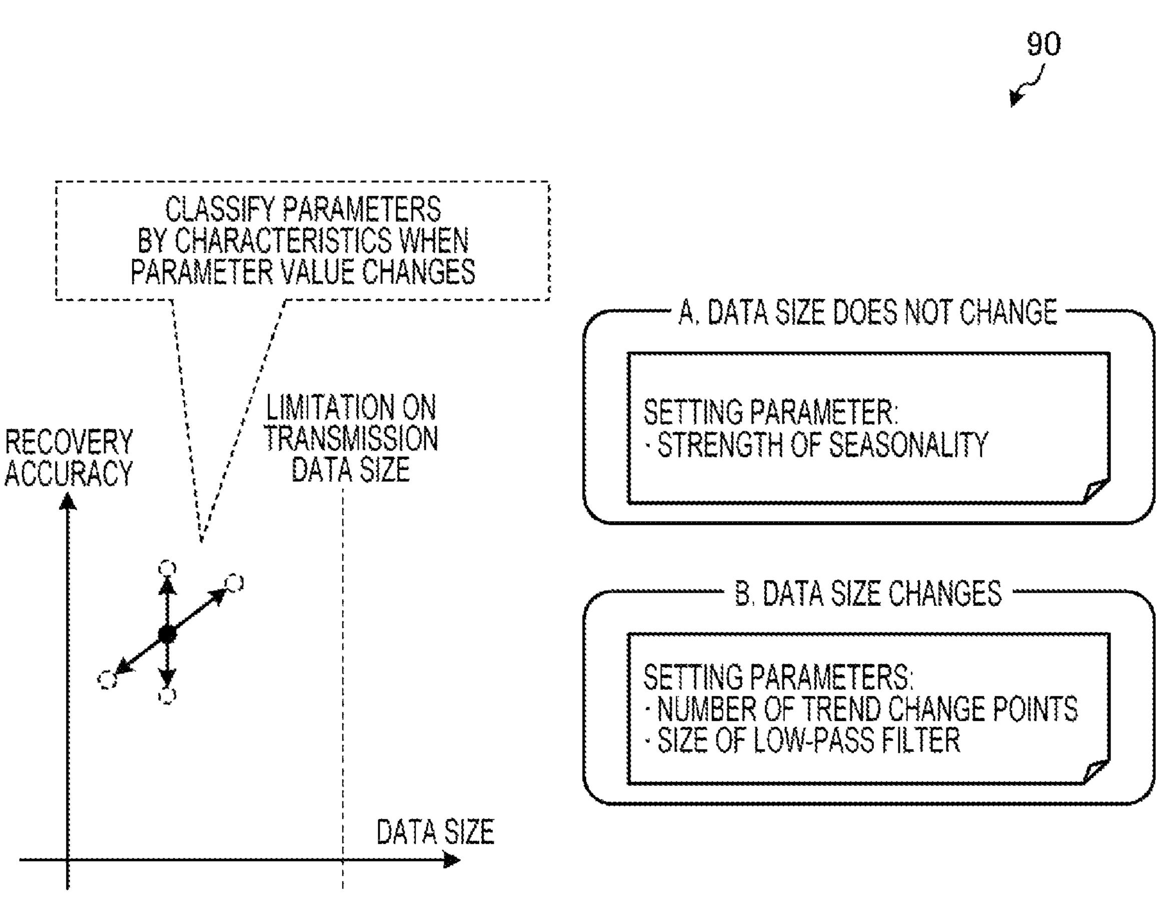
FIG. 9B illustrates another example of adjustment of a feature amount extraction parameter according to the present disclosure.

FIGS. 9A and 9B collectively illustrate adjustment 90 which is an example of adjustment of the feature amount extraction parameters according to the present disclosure.

An operator (for example, an operator of the network monitoring system 11 in FIG. 1) of a network collects information on traffic of the monitored network (for example, the network 13 of FIG. 1). The monitored network is a target of traffic measurement. When information on traffic is collected, the operator may need to consider an available network bandwidth of a collection route. That is, more information may need to be obtained more accurately under a limitation of a data size of collected information.

Similarly, regarding the time-series data recovery utilizing the STL decomposition, the operator needs to improve the recovery system as much as possible under the limitation of the data size. In this respect, the network monitoring system 11 improves the recovery system under the limitation of the data size, by optimizing the parameters of the STL decomposition.

As illustrated in FIG. 9A, the encoder 23 optimizes the parameters of the STL decomposition. Specifically, the encoder 23 optimizes the strength of the seasonality, the number of trend change points, and the size of the low-pass filter. The encoder 23 can optimize the parameters for each time of transmission (data transmission period T) of the bandwidth value data.

As illustrated in FIG. 9B, the encoder 23 classifies the parameters according to characteristics when parameter values change.

The encoder 23 can determine whether a change in data size exceeds a threshold. In a case where the change in data size does not exceed the threshold, the encoder 23 can adjust the strength of the seasonality. In a case where the change in data size exceeds the threshold, the encoder 23 can adjust the number of trend change points or the size of the low-pass filter.

The encoder 23 classifies parameters without a change in data size as a parameter group A. The encoder 23 classifies parameters with a change in data size as a parameter group B. For example, the strength of the seasonality is classified as the parameter group A. The number of trend change points and the size of the low-pass filter are classified as the parameter group B.

The parameters "the strength of the seasonality, the number of trend change points, and the size of the low-pass filter" affect a sent data size and the recovery accuracy. A parameter value is determined by reflecting characteristics of this effect.

The encoder 23 obtains optimal solutions of the parameter group A and the parameter group B, respectively. The parameter group A and the parameter group B are independent from each other. Hence, the obtained optimal solutions are overall final optimal solutions.

5-5-1. Optimization of Parameter Group A

Figure 10A:
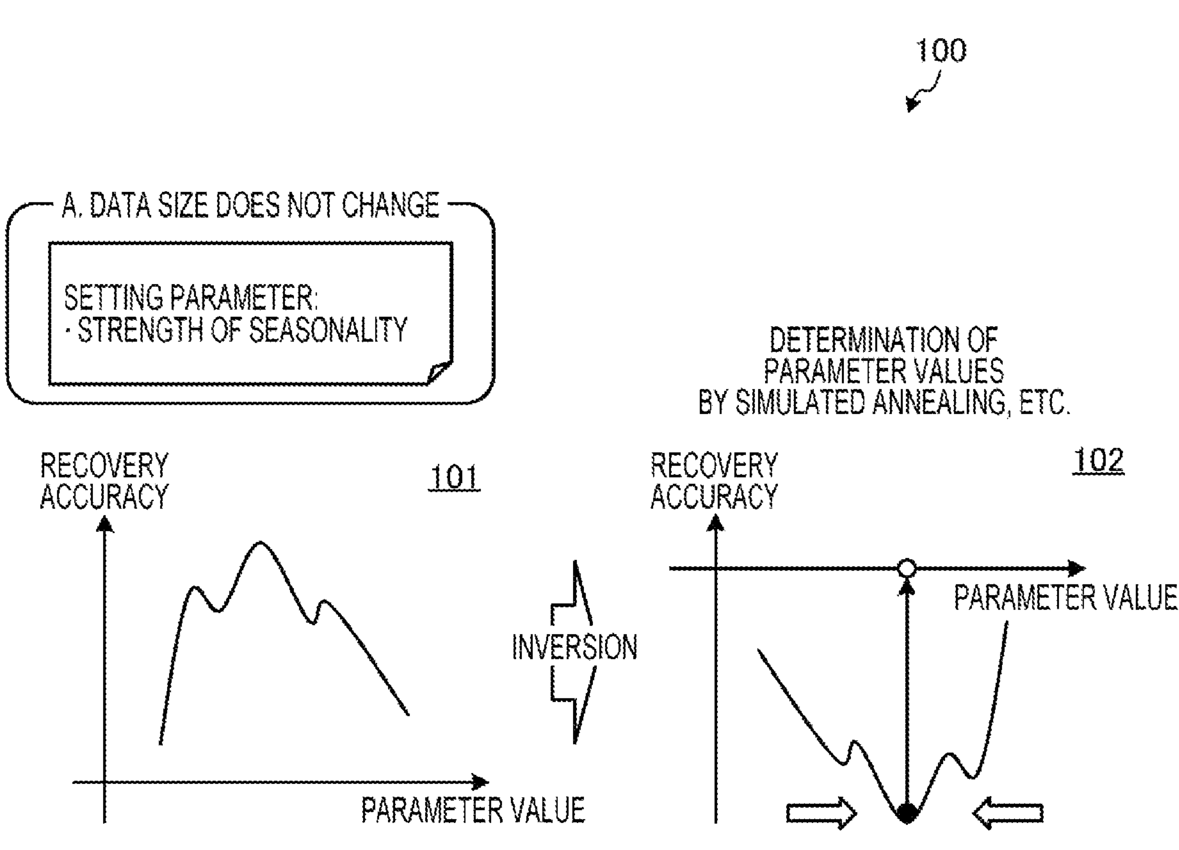
FIG. 10A illustrates an example of optimization of a parameter group A according to the present disclosure.
Figure 10B:
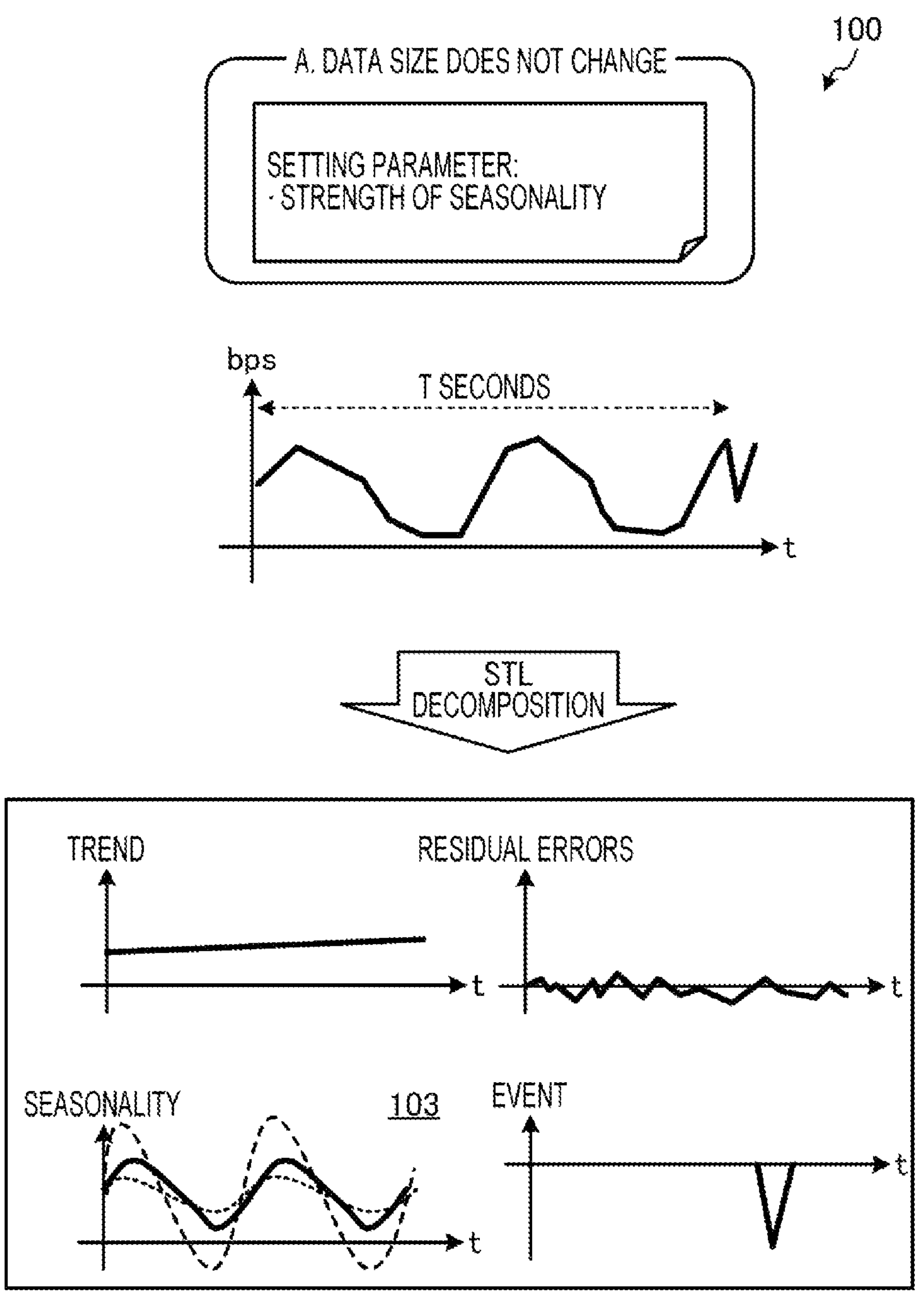
FIG. 10B illustrates another example of optimization of the parameter group A according to the present disclosure.

FIGS. 10A and 10B collectively illustrate optimization 100 that is an example of optimization of the parameter group A according to the present disclosure. As illustrated in FIG. 10A, the encoder 23 derives a relationship between a parameter variable and the recovery accuracy. Accordingly, the encoder 23 obtains the optimum parameter value by applying an algorithm such as simulated annealing to this relationship.

Here, characteristics of the "strength of seasonality" will be described. As illustrated in FIG. 10B, the parameter group A includes the strength of seasonality. In the STL decomposition, the time-series data is fitted to a model where the terms are combined. The original data is the sum of the trend term, the seasonality term, and the residual errors. In a case where a parameter value for determining a size of the seasonality term is large, the time-series data fits a model having a large periodicity.

5-5-2. Optimization of Parameter Group B

Figure 11C:
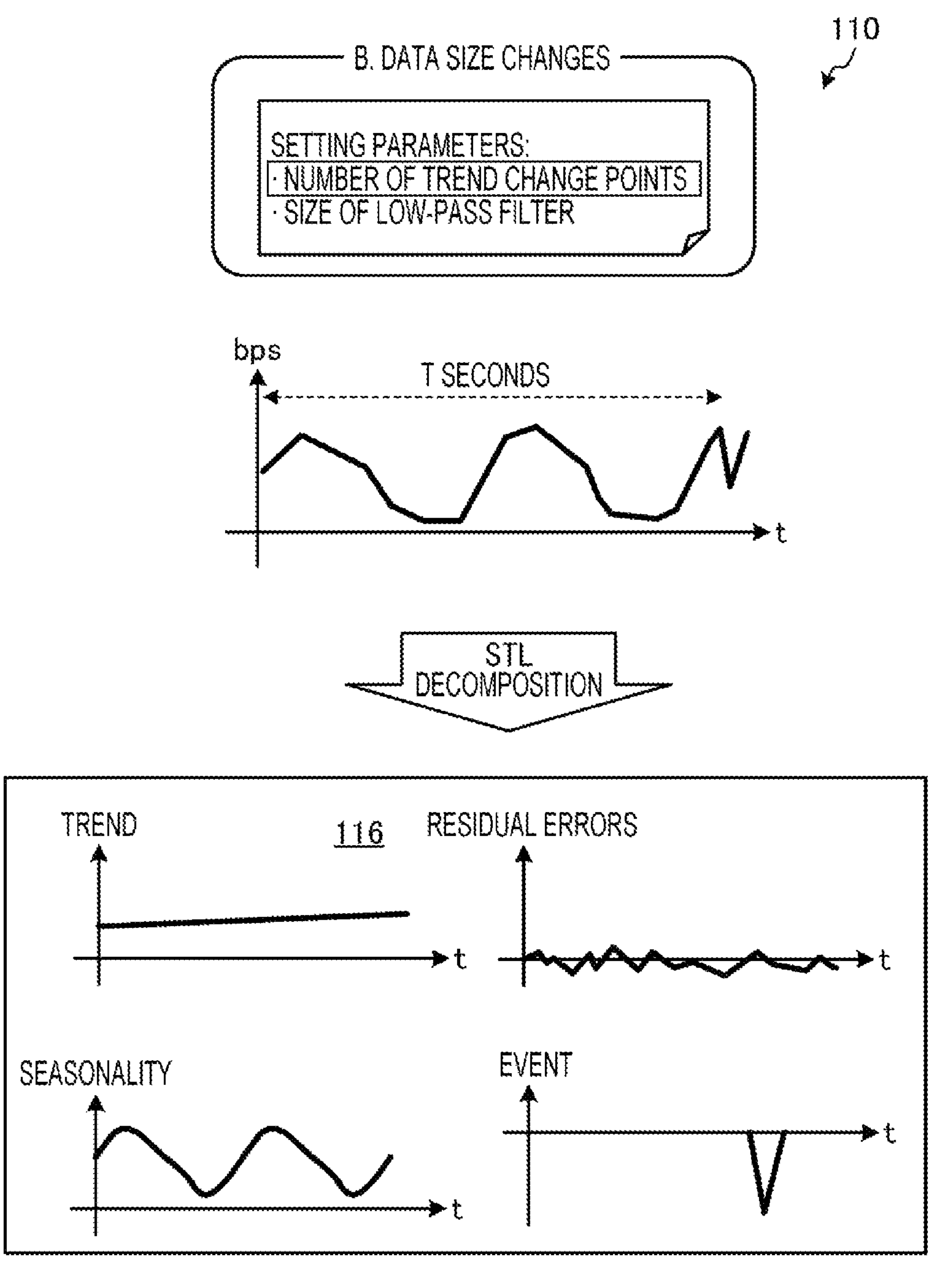
FIG. 11C illustrates still another example of optimization of the parameter group B according to the present disclosure.

FIGS. 11A, 11B, 11C, and 11D collectively illustrate optimization 110 that is an example of optimization of the parameter group B according to the present disclosure. As illustrated in FIG. 11A, the encoder 23 focuses on an upper limit of a data size and creates a constraint condition of the parameter group. As illustrated in FIG. 11B, the encoder 23 derives a parameter group in which the recovery accuracy becomes the maximum value under the constraint condition. Numerical analysis is used to derive the parameter group.

With reference to FIG. 11A, a program for deriving a parameter group is started (111). First, the encoder 23 derives a relationship (plane A) between a parameter group and a size of transmission data (112). The encoder 23 derives an intersection line x between an upper limit of a data size and the plane A (113).

With reference to FIG. 11B, the encoder 23 derives a relationship (plane B) between a parameter group and recovery accuracy (114). The encoder 23 derives a parameter that maximizes a value of recovery accuracy (plane B) on the intersection line x (115). Thereafter, the program ends.

Figure 11D:
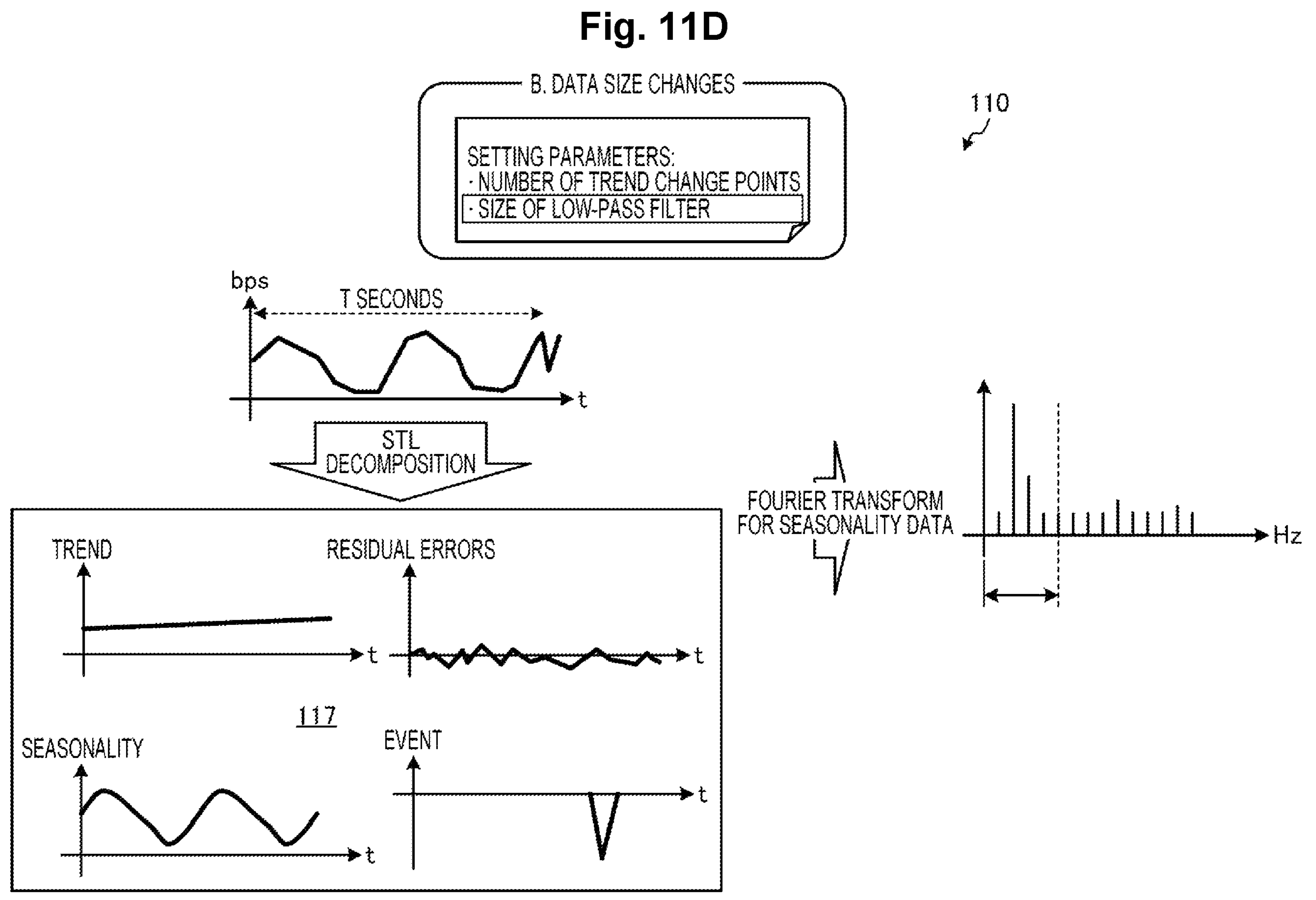
FIG. 11D illustrates still another example of optimization of the parameter group B according to the present disclosure.

Here, characteristics of the "number of trend change points" and the "size of the low-pass filter" will be described below. As described above with reference to FIG. 10B, in the STL decomposition, the time-series data is fitted to a model where the terms are combined. As described above, the original data is the sum of the trend term, the seasonality term, and the residual errors. As illustrated in FIG. 11C, as the number of trend change points increases, the trend can be fitted to the time-series data that is a target of decomposition, with high accuracy. Regarding the size of the low-pass filter, the low-pass filter is used to transmit only data in a low-frequency band of the seasonality data after the Fourier transform. As illustrated in FIG. 11D, the size of the low-pass filter is a frequency bandwidth extracted from a function after the Fourier transform.

6. Sequence Diagram of Network Monitoring Process

Next, a sequence diagram of an example of the network monitoring process according to the present disclosure will be described with reference to FIG. 12. Examples of the network monitoring process include a process for collecting time-series data having bandwidth values. The process for collecting time-series data having the bandwidth values is performed by, for example, the network monitoring system 11 in FIG. 1.

Figure 12:
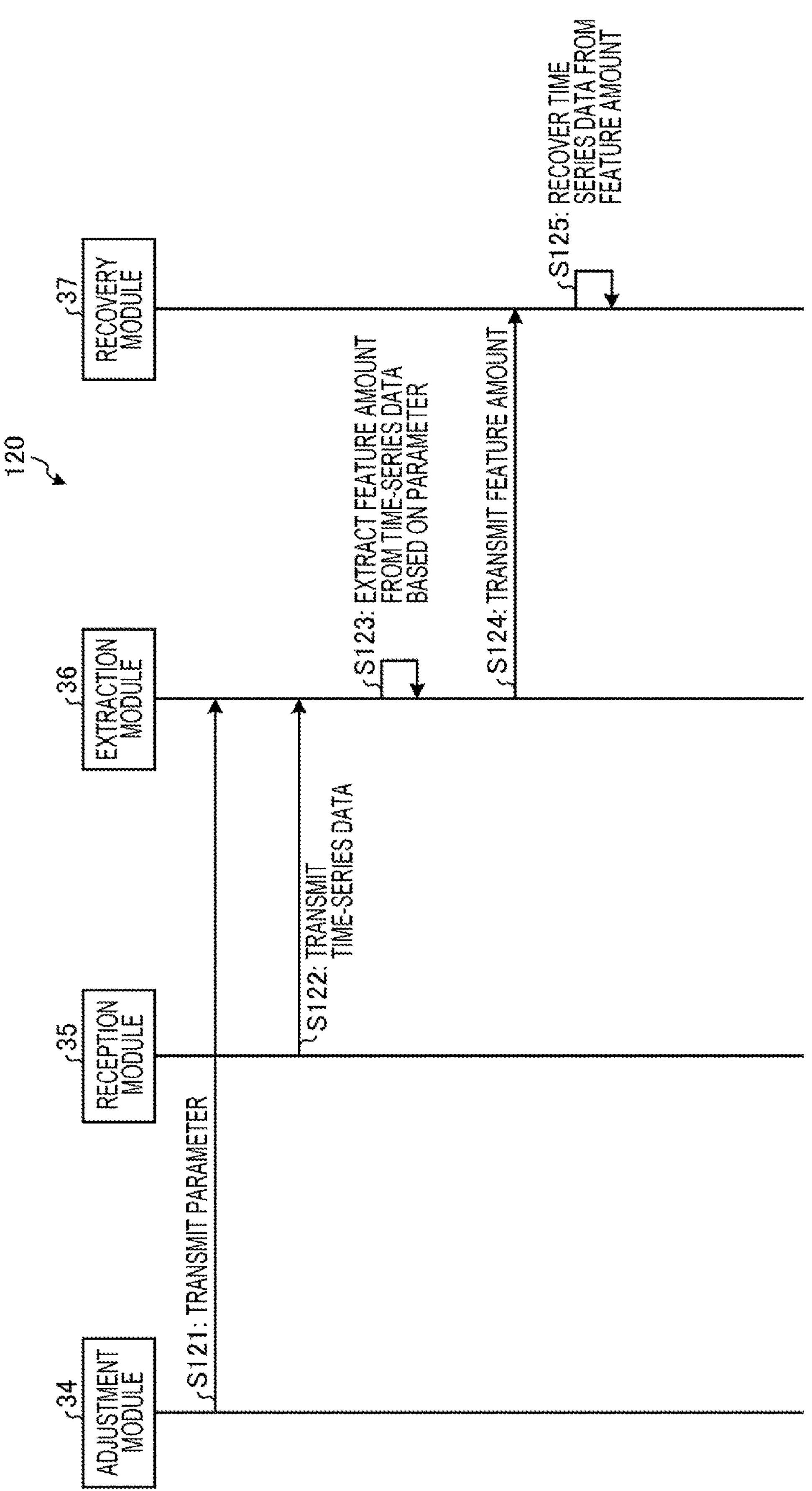
FIG. 12 is a sequence diagram illustrating an example of a process for collecting time-series data having a bandwidth value.

FIG. 12 is a sequence diagram illustrating a process 200 that is an example of a process for collecting time-series data having bandwidth values.

In Step S121, the adjustment module 34 of the network monitoring system 11 transmits parameters of the STL decomposition to the extraction module 36 of the network monitoring system 11.

In Step S122, the reception module 35 of the network monitoring system 11 transmits the time-series data having the bandwidth value of the monitored network to the extraction module 36.

In Step S123, the extraction module 36 extracts a feature amount of time-series data from the time-series data on the basis of the parameters of the STL decomposition.

In Step S124, the extraction module 36 transmits the feature amount of the time-series data to the recovery module 37 of the network monitoring system 11.

In Step S125, the recovery module 37 recovers the time-series data having the bandwidth value from the feature amount of the time-series data.

7. Effects

As described above, the network monitoring system 11 utilizes the STL decomposition in transmission of the time-series data having bandwidths. The time-series data having the bandwidths is important from the viewpoint of network maintenance and operation. The extraction module 36 of the network monitoring system 11 extracts the feature amount of the time-series data by applying the STL decomposition to the time-series data. Accordingly, the extraction module 36 transmits the feature amount of the time-series data to the recovery module 37 of the network monitoring system 11. As a result, the network monitoring system 11 can reduce a bandwidth of the collection route.

8. Others

Part of the process described as a process performed automatically may be performed manually. Alternatively, all or a part of the process described as process to be performed manually may be performed automatically by a known method. Furthermore, procedures of a process, specific names, and information including various data and parameters illustrated in the present specification and drawings can be arbitrarily changed unless otherwise specified. For example, various kinds of information illustrated in the drawings are not limited to those illustrated in the drawings.

The components of the system and the devices illustrated in the drawings are conceptual illustrations of the functions of the system and the devices. The components are not necessarily physically configured as illustrated in the drawings. In other words, specific forms of the distributed or integrated system and devices are not limited to the forms of the system and the devices illustrated in the drawings. All or some of the system and the devices may be functionally or physically distributed or integrated, depending on various loads and usage situations.

9. Hardware Configuration

Figure 13:
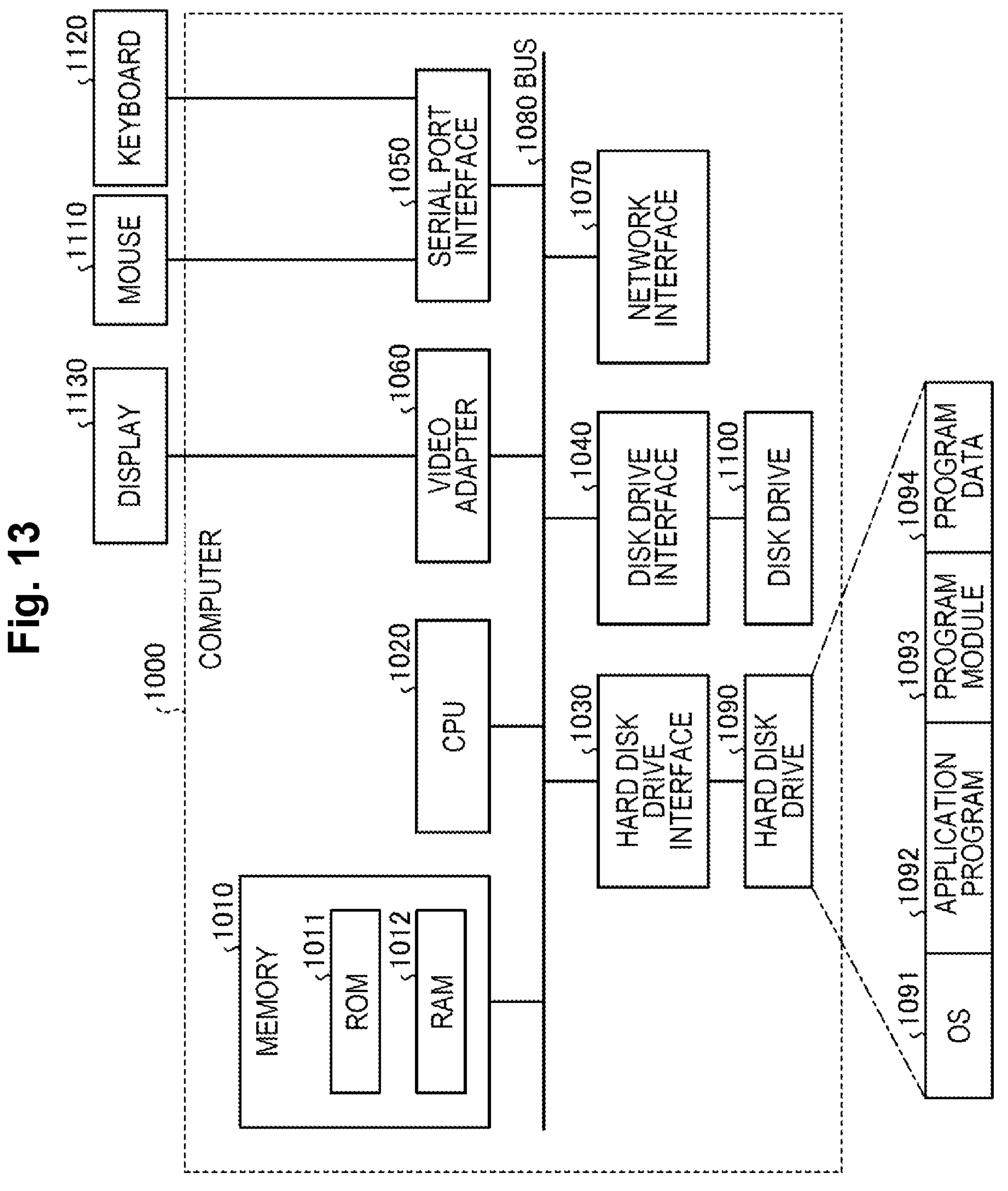
FIG. 13 illustrates an example of a hardware configuration of a computer.

FIG. 13 is a diagram illustrating a computer 1000 that is an example of a hardware configuration of a computer. The system and method described in the present specification are implemented by, for example, the computer 1000 illustrated in FIG. 13.

FIG. 13 illustrates an example of a computer on which a program is executed and thus the network monitoring system 11 is implemented. A computer 1000 includes a memory 1010 and a CPU 1020, for example. In addition, the computer 1000 also includes a hard disk drive interface 1030, a disk drive interface 1040, a serial port interface 1050, a video adapter 1060, and a network interface 1070. These components are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected with a hard disk drive 1090. The disk drive interface 1040 is connected with a disk drive 1100. For example, a removable storage medium such as a magnetic disk or an optical disk is inserted into the disk drive 1100. The serial port interface 1050 is connected with, for example, a mouse 1110 and a keyboard 1120. The video adapter 1060 is connected to a display 1130, for example.

The hard disk drive 1090 stores, for example, an OS 1091, an application program 1092, a program module 1093, and program data 1094. That is, a program that defines each process of the network monitoring system 11 is implemented as the program module 1093 in which a code executable by the computer 1000 is described. The program module 1093 is stored in, for example, the hard disk drive 1090. For example, the program module 1093 for executing the same processes as those in the functional configuration of the network monitoring system 11 is stored in the hard disk drive 1090. Note that the hard disk drive 1090 may be replaced with a solid state drive (SSD).

The hard disk drive 1090 can store a program for collecting traffic data for executing a network monitoring process. In addition, the program for collecting traffic data can be created as a program product. In a case where the program is executed, the program product performs one or a plurality of methods as described above.

In addition, the setting data that is used in the processes of the embodiment described above is stored as the program data 1094 in the memory 1010 or the hard disk drive 1090, for example. The CPU 1020 reads the program module 1093 and the program data 1094 stored in the memory 1010 and the hard disk drive 1090 to the RAM 1012 as necessary and executes the program module 1093 and the program data 1094.

Note that the program module 1093 and the program data 1094 are not necessarily stored in the hard disk drive 1090, but may be stored in a removable storage medium and be read by the CPU 1020 via the disk drive 1100 or the like, for example. Alternatively, the program module 1093 and the program data 1094 may be stored in another computer connected via a network (for example, LAN, WAN, or the like). Accordingly, the program module 1093 and the program data 1094 may be read by the CPU 1020 from another computer via the network interface 1070.

10. Summary of Embodiments

As described above, the network monitoring system 11 according to the present disclosure includes the reception module 35, the extraction module 36, and the recovery module 37. In at least one embodiment, the reception module 35 receives the time-series data having the bandwidth value of the monitored network. In at least one embodiment, the extraction module 36 extracts a feature amount of time-series data from the time-series data having the bandwidth value by applying a seasonal adjustment method to the time-series data. Accordingly, the extraction module 36 transmits the feature amount of the time-series data via a network for collecting traffic data of the monitored network. In at least one embodiment, the recovery module 37 receives the feature amount of the time-series data via the network for collecting traffic data of the monitored network. Accordingly, the recovery module 37 recovers the time-series data having the bandwidth value from the feature amount of the time-series data.

In some embodiments, the extraction module 36 decomposes, into the trend term, the seasonality term, and the residual error term, the time-series data having the bandwidth value by applying the STL decomposition to the time-series data and extracts the feature amount of the time-series data from the trend term, the seasonality term, and the residual error term.

As described above, the network monitoring system 11 according to the present disclosure includes the adjustment module 34. In at least one embodiment, the parameters of the STL decomposition are adjusted based on change in size of the time-series data when the parameters are changed. In some embodiments, the extraction module 36 decomposes, into the trend term, the seasonality term, and the residual error term, the time-series data having the bandwidth value by applying the STL decomposition based on the parameters adjusted by the adjustment module 34 to the time-series data.

In some embodiments, the adjustment module 34 determines whether the change in size of the time-series data exceeds the threshold, adjusts the parameter that is the strength of the seasonality in a case where the change in size of the time-series data does not exceed the threshold, and adjusts the parameter that is the number of trend change points or the size of the low-pass filter in a case where the change in size of the time-series data exceeds the threshold.

In some embodiments, the extraction module 36 extracts the event term indicating the variation due to an event from the time-series data having the bandwidth value. Accordingly, the extraction module 36 transmits the event term as the feature amount of the time-series data.

In some embodiments, the extraction module 36 extracts the feature amount of the time-series data from the time-series data having the bandwidth value in the predetermined period. In some embodiments, the recovery module 37 recovers the time-series data having the bandwidth value in the predetermined period, based on the feature amount of the time-series data and the predetermined period.

Although various embodiments have been described in detail in this specification with reference to the drawings, these embodiments are merely examples and are not intended to limit the present invention to these embodiments. The features described in this specification may be achieved by various methods, including various modifications and improvements based on the knowledge of those skilled in the art.

In addition, each "module", each suffix "-er", and each suffix "-or" in the above description can be read as a unit, a means, a circuit, or the like. For example, a communication module, a control module, and a storage module can be replaced with a communication unit, a control unit, and a storage unit, respectively.

REFERENCE SIGNS LIST

10 Environment
11 Network monitoring system
12 Monitoring line
13 Network
31 Communication module
32 Control module
33 Storage module
34 Adjustment module
35 Reception module
36 Extraction module
37 Recovery module

The invention claimed is:

1. A traffic data collecting system comprising a processor configured to execute operations comprising:
   - receiving time-series data having a bandwidth value of a monitored network;
   - extracting a feature amount of the time-series data from the time-series data having the bandwidth value by applying a seasonal adjustment method to the time-series data, wherein the extracting further comprises:
     - decomposing, based on a parameter of scatterplot smoothing (Loess) (STL) decomposition adjusted to the time-series data, the time-series data into a trend term, a seasonality term, and a residual error term, by applying seasonal and trend decomposition using locally estimated STL decomposition to the time-series data having the bandwidth value, and
     - extracting the feature amount of the time-series data from the trend term, the seasonality term, and the residual error term;
   - adjusting the parameter of the STL decomposition based on a change in size of the time-series data when the parameter is changed by determining whether a change in size of the time-series data exceeds a threshold, adjusts the parameter that is strength of seasonality in a case where the change in size of the time-series data does not exceed the threshold, and adjusts the parameter that is the number of trend change points in a case where the change in size of the time-series data exceeds the threshold;
   - transmitting the feature amount of the time-series data via a network for collecting traffic data of the monitored network;
   - receiving the feature amount of the time-series data via the network for collecting traffic data of the monitored network; and
   - recovering the time-series data having the bandwidth value from the feature amount of the time-series data.

2. The traffic data collecting system according to claim 1, wherein the adjusting further comprises adjusting the parameter in a case where the change in size of the time-series data exceeds the threshold.

3. The traffic data collecting system according to claim 1, wherein
   - the extraction module extracts an event term indicating a variation due to an event from the time-series data having the bandwidth value, and
   - the transmission module transmits the event term as the feature amount of the time-series data.

4. The traffic data collecting system according to claim 1, wherein
   - the extraction module extracts the feature amount of the time-series data from the time-series data having the bandwidth value in a predetermined period, and
   - the recovery module recovers the time-series data having the bandwidth value in the predetermined period, based on the feature amount of the time-series data and the predetermined period.

5. The traffic data collecting system according to claim 1, the processor further configured to execute operations comprising:
   - generating restored trend data from slope/intercept data and trend change points.

6. The traffic data collecting system according to claim 5, wherein the decoding further comprises producing reconstructed seasonal data by applying an inverse Fourier transform to spectral data.

7. The traffic data collecting system according to claim 1, wherein the parameter represents the number of trend change points in a case where the change in size of the time-series data exceeds the threshold.

8. The traffic data collecting system according to claim 1, wherein the parameter represents a size of a low-pass filter in a case where the change in size of the time-series data exceeds the threshold.

9. A method for collecting traffic data which is executed by a computer, the method comprising:
   - receiving time-series data having a bandwidth value of a monitored network;
   - extracting a feature amount of the time-series data from the time-series data having the bandwidth value by applying a seasonal adjustment method to the time-series data, wherein the extracting further comprises:
     - decomposing, based on a parameter of scatterplot smoothing (Loess) (STL) decomposition adjusted to the time-series data, the time-series data into a trend term, a seasonality term, and a residual error term, by applying seasonal and trend decomposition using locally estimated STL decomposition to the time-series data having the bandwidth value, and extracting the feature amount of the time-series data from the trend term, the seasonality term, and the residual error term;

adjusting a parameter of the STL decomposition based on a change in size of the time-series data when the parameter is changed by determining whether a change in size of the time-series data exceeds a threshold, adjusts the parameter that is strength of seasonality in a case where the change in size of the time-series data does not exceed the threshold, and adjusts the parameter that is the number of trend change points in a case where the change in size of the time-series data exceeds the threshold;

transmitting the feature amount of the time-series data via a network for collecting traffic data of the monitored network;

receiving the feature amount of the time-series data via the network for collecting traffic data of the monitored network; and recovering the time-series data having the bandwidth value from the feature amount of the time-series data.

10. The method for collecting traffic data according to claim 9, the method further comprises:

decomposing, into a trend term, a seasonality term, and a residual error term, the time-series data having the bandwidth value by applying seasonal and trend decomposition using locally estimated scatterplot smoothing (Loess) (STL) decomposition to the time-series data and extracts the feature amount of the time-series data from the trend term, the seasonality term, and the residual error term.

11. The method for collecting traffic data according to claim 9, wherein the adjusting further comprises adjusting the parameter in a case where the change in size of the time-series data exceeds the threshold.

12. The method for collecting traffic data according to claim 9, the method further comprises:

extracting an event term indicating a variation due to an event from the time-series data having the bandwidth value, and transmitting the event term as the feature amount of the time-series data.

13. The method for collecting traffic data according to claim 9, the method further comprises:

extracting the feature amount of the time-series data from the time-series data having the bandwidth value in a predetermined period, and recovering the time-series data having the bandwidth value in the predetermined period, based on the feature amount of the time-series data and the predetermined period.

14. The method according to claim 9, wherein the parameter represents the number of trend change points in a case where the change in size of the time-series data exceeds the threshold.

15. The method according to claim 9, wherein the parameter represents a size of a low-pass filter in a case where the change in size of the time-series data exceeds the threshold.

16. A computer-readable non-transitory recording medium storing computer-executable program instructions that when executed by a processor cause a computer to execute operations comprising:

receiving time-series data having a bandwidth value of a monitored network;

extracting a feature amount of the time-series data from the time-series data having the bandwidth value by applying a seasonal adjustment method to the time-series data, wherein the extracting further comprises:

decomposing, based on a parameter of scatterplot smoothing (Loess) (STL) decomposition adjusted to the time-series data, the time-series data into a trend term, a seasonality term, and a residual error term, by applying seasonal and trend decomposition using locally estimated STL decomposition to the time-series data having the bandwidth value, and extracting the feature amount of the time-series data from the trend term, the seasonality term, and the residual error term;

adjusting a parameter of the STL decomposition based on a change in size of the time-series data when the parameter is changed by determining whether a change in size of the time-series data exceeds a threshold, adjusts the parameter that is strength of seasonality in a case where the change in size of the time-series data does not exceed the threshold, and adjusts the parameter that is the number of trend change points in a case where the change in size of the time-series data exceeds the threshold;

transmitting the feature amount of the time-series data via a network for collecting traffic data of the monitored network;

receiving the feature amount of the time-series data via the network for collecting traffic data of the monitored network; and recovering the time-series data having the bandwidth value from the feature amount of the time-series data.

17. The computer-readable non-transitory recording medium according to claim 16, wherein the adjusting further comprises adjusting the parameter in a case where the change in size of the time-series data exceeds the threshold.

18. The computer-readable non-transitory recording medium according to claim 16, wherein the collecting traffic data method further comprises:

extracting an event term indicating a variation due to an event from the time-series data having the bandwidth value, and transmitting the event term as the feature amount of the time-series data.

19. The computer-readable non-transitory recording medium according to claim 16, wherein the collecting traffic data method further comprises:

extracting the feature amount of the time-series data from the time-series data having the bandwidth value in a predetermined period, and recovering the time-series data having the bandwidth value in the predetermined period, based on the feature amount of the time-series data and the predetermined period.

20. The computer-readable non-transitory recording medium according to claim 16, wherein the parameter represents the number of trend change points in a case where the change in size of the time-series data exceeds the threshold.

21. The computer-readable non-transitory recording medium according to claim 16, wherein the parameter represents a size of a low-pass filter in a case where the change in size of the time-series data exceeds the threshold.

22. The computer-readable non-transitory recording medium according to claim 16, wherein the parameter represents the number of trend change points in a case where the change in size of the time-series data exceeds the threshold.

23. The computer-readable non-transitory recording medium according to claim 16, wherein the parameter represents a size of a low-pass filter in a case where the change in size of the time-series data exceeds the threshold.

* * * * *